United States Patent [19]
Chen et al.

[11] Patent Number: 5,917,830
[45] Date of Patent: Jun. 29, 1999

[54] SPLICING COMPRESSED PACKETIZED DIGITAL VIDEO STREAMS

[75] Inventors: David Chen, Ivyland, Pa.; Weidong Mao, Princeton, N.J.

[73] Assignee: General Instrument Corporation, Horsham, Pa.

[21] Appl. No.: 08/734,629

[22] Filed: Oct. 18, 1996

[51] Int. Cl.[6] ........................................ H04N 9/74
[52] U.S. Cl. ................. 370/487; 370/498; 370/527; 348/473; 455/6.3
[58] Field of Search ...................... 370/345, 486, 370/487, 490, 498, 527; 348/473; 455/6.3

[56] References Cited

U.S. PATENT DOCUMENTS

| | | | |
|---|---|---|---|
| 4,449,249 | 5/1984 | Price | 370/487 |
| 5,526,035 | 6/1996 | Lappington et al. | 348/13 |
| 5,534,944 | 7/1996 | Egawa et al. | 348/473 |

OTHER PUBLICATIONS

"The Grand Alliance Transport System," *Grand Alliance HDTV System Specification*, Apr. 14, 1994, pp. 52–57 (Section 5.8—Local Program Insertion).

"Revised Text for ITU–T Recommendation H.222.0 | ISO/IEC 13818–1, Information technology—Generic coding of moving pictures and associated audio information: Systems," *ISO/IEC JTC 1/SC 29*, Apr. 27, 1995, pp. 135–138 (Annex L—Splicing Transport Streams).

Bill Helms et al., "Switching and Splicing of MPEG–2 Transport Streams," DiviCom, Inc. (Boulder, CO), Jun. 19, 1996 or earlier, pp. 1–12.

William Y. Zou, "Considerations of Compression Bit Rate for Switching/insertion," May 15, 1996, pp. 1–2.

Mike Perkins et al., "A Proposed Standard for Splicing v 1.0," DiviCom, Inc. (Boulder, CO), Aug. 1, 1996, pp. 1–15.

Hayder Radha et al. (Philips Research), "Constraints on Bitstreams for Seamless Splicing," *Contribution to SMPTE Packetized Television (PT20) Working Group on Switching and Synchronization (PT20.02)*, Aug. 23, 1996, pp. 1–6.

*Primary Examiner*—Chi H. Pham
*Assistant Examiner*—Ricky Q. Ngo
*Attorney, Agent, or Firm*—Barry R. Lipsitz; Ralph F. Hoppin

[57] ABSTRACT

A secondary packetized data stream, such as a commercial, is spliced with a primary packetized data stream, such as a network television program. The system does not require decompression of the data in the primary data stream, and is particularly suitable for use at a cable system headend to allow the insertion of commercials from local businesses into a nationally broadcast television program. When a start signal is received, a pre-splicing packet of the primary stream is determined. The pre-splicing packet is the packet closest to the start time which carries an anchor frame (e.g., I or P frame) start code. To prevent a potential discontinuity at the decoder, the pre-splicing packet is processed to discard the anchor frame data, and to insert a number of stuffing bytes which is equal to the number of bytes discarded into an adaptation field of the pre-splicing packet. To further maintain continuity at the decoder, identifying data of the primary stream such as PID and PSI data, is retrieved and provided to the secondary stream. A number of null packets are inserted into the output stream at the transition point between the main program and the commercial to prevent a buffer overflow at a decoder which receives the output stream.

29 Claims, 14 Drawing Sheets

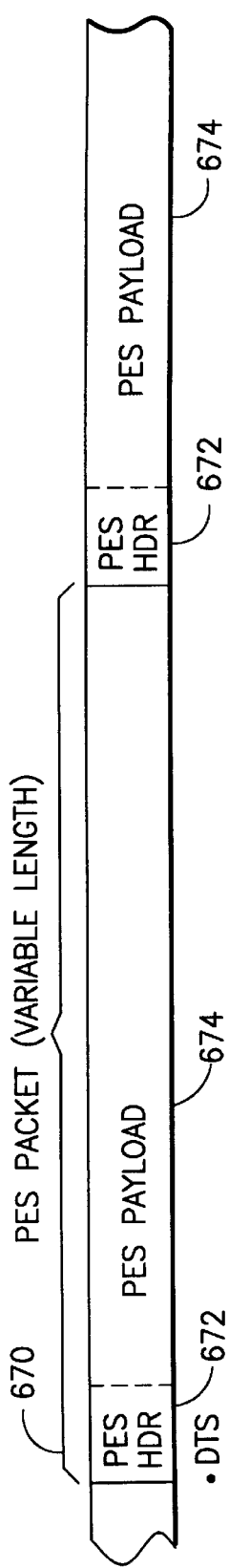
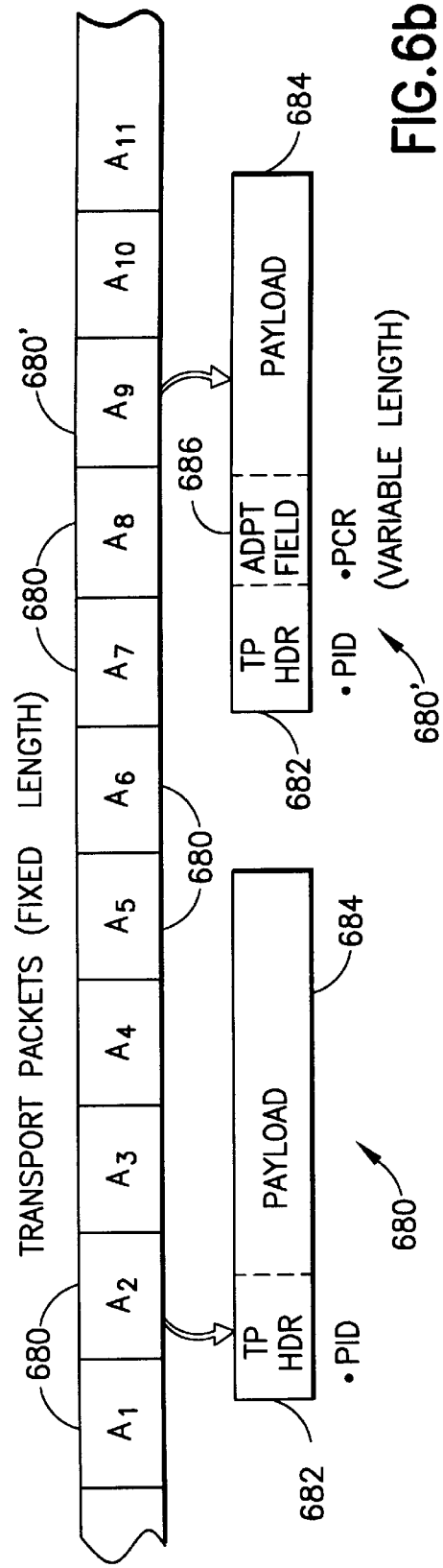
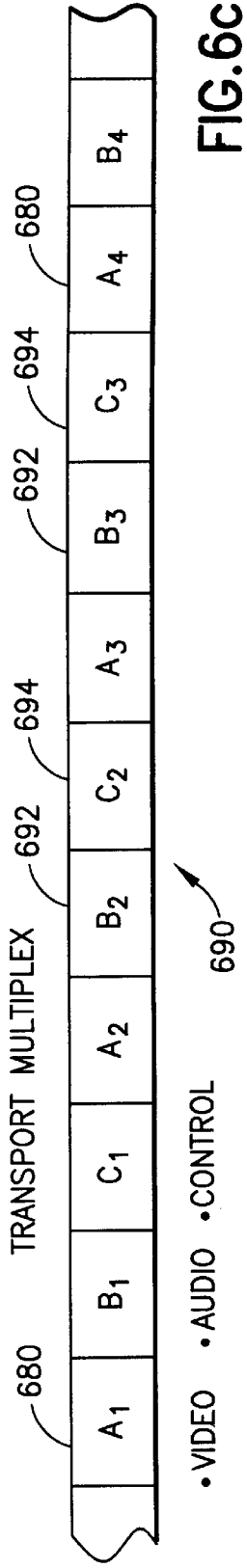

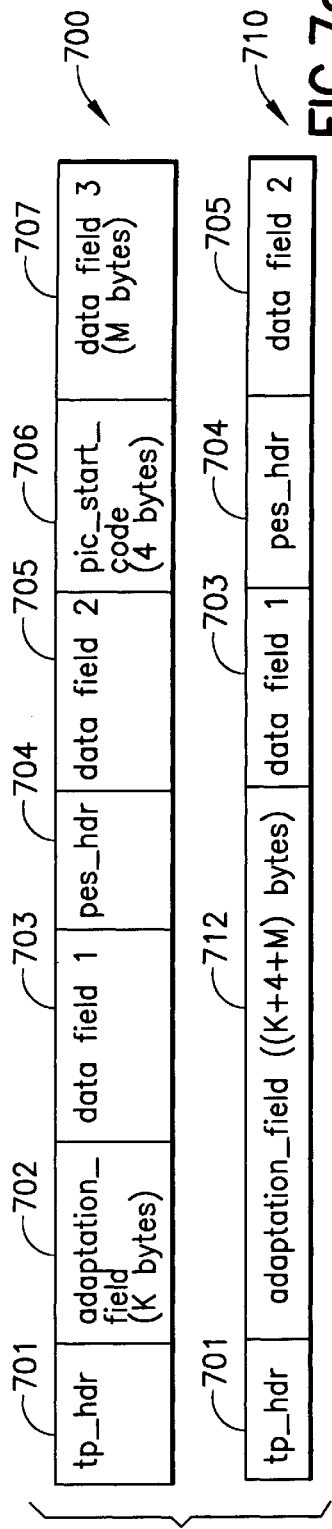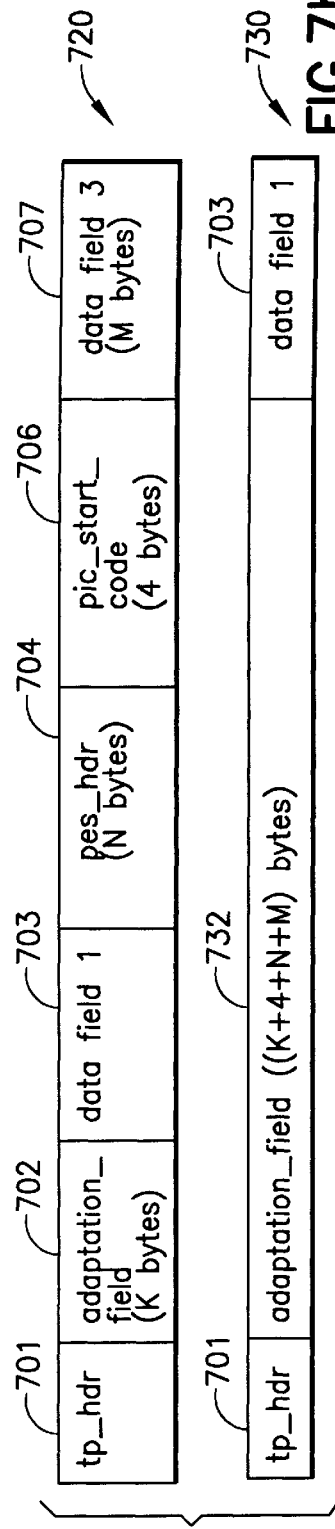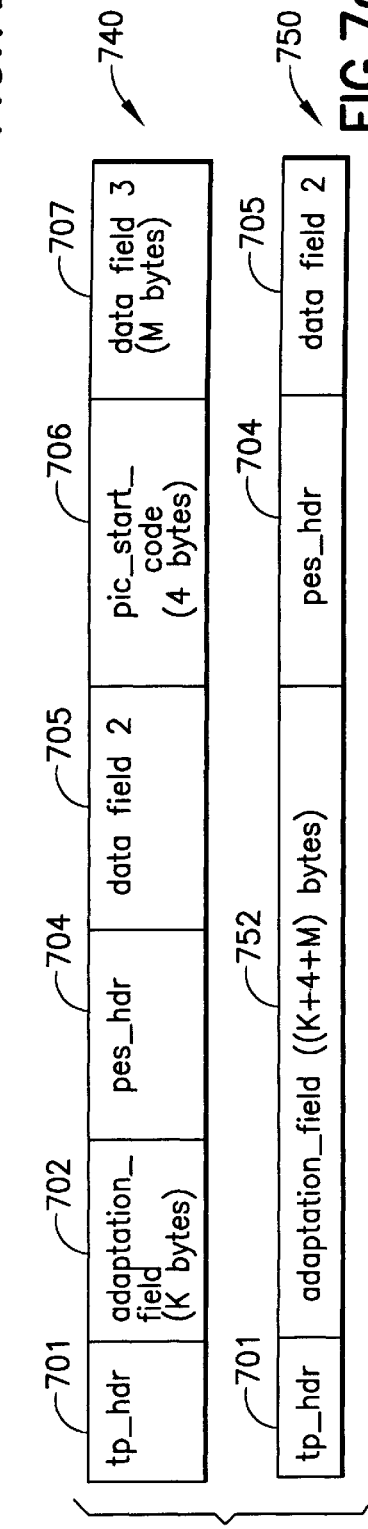

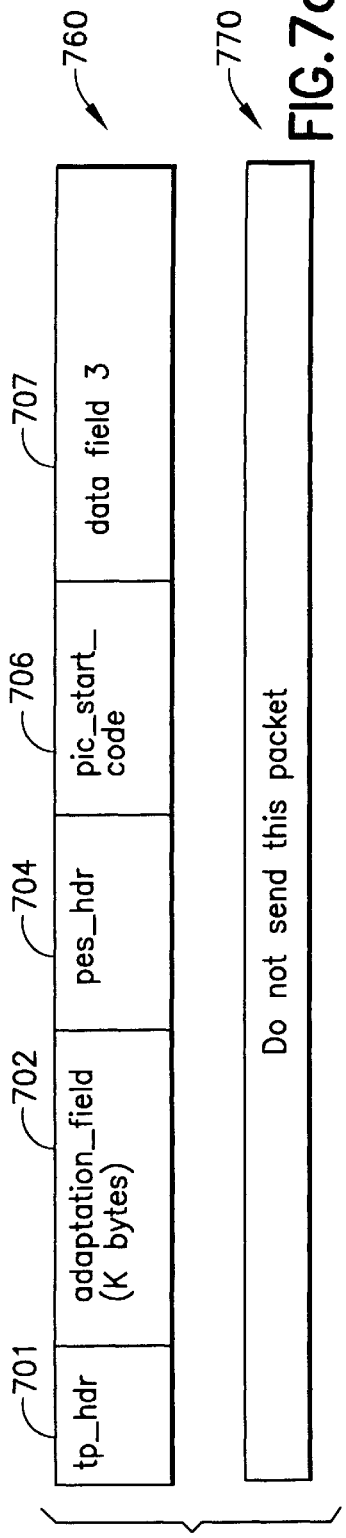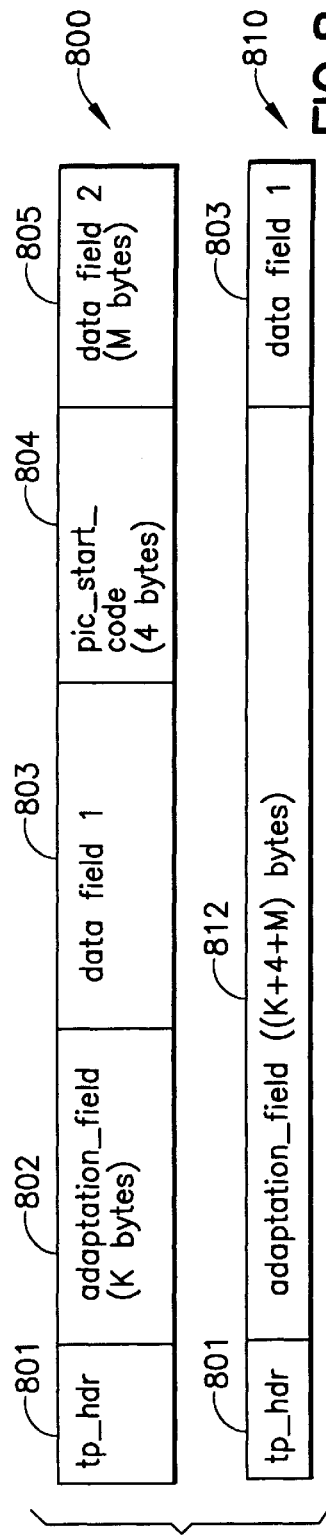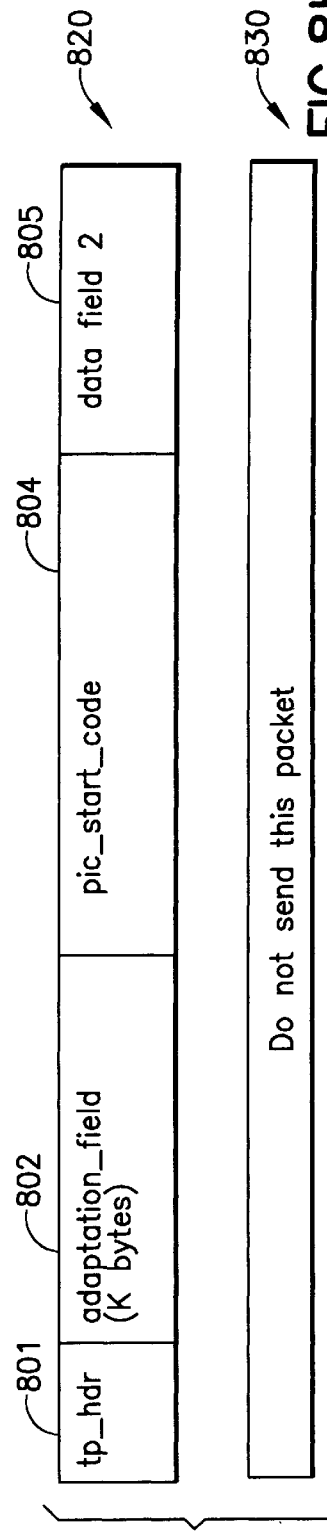

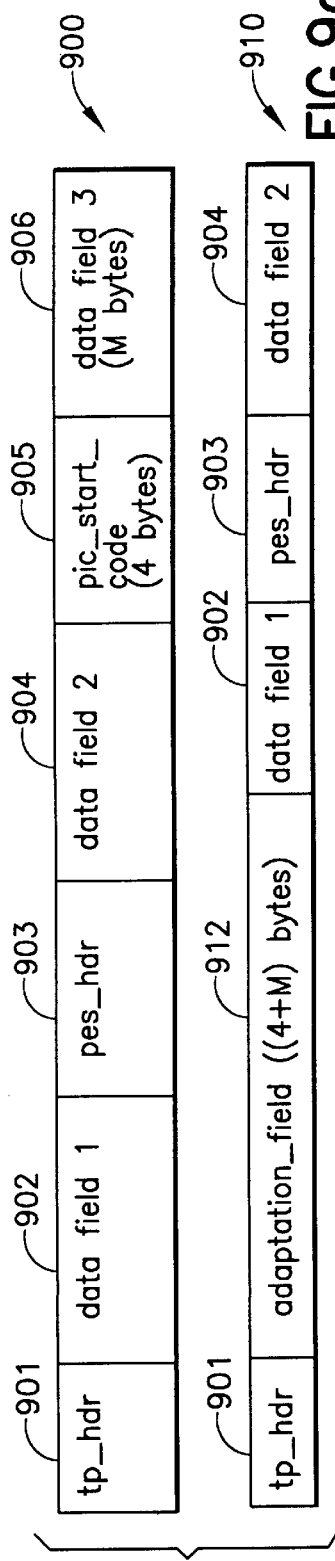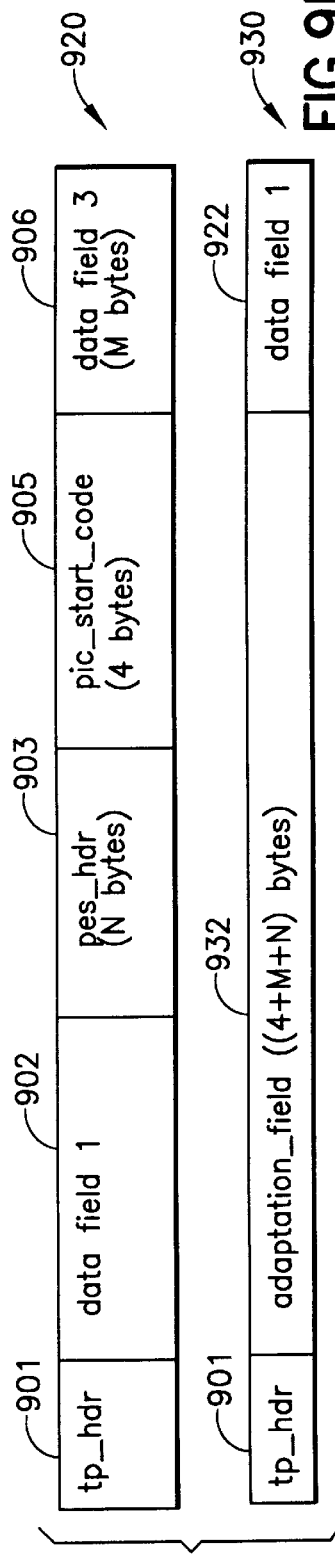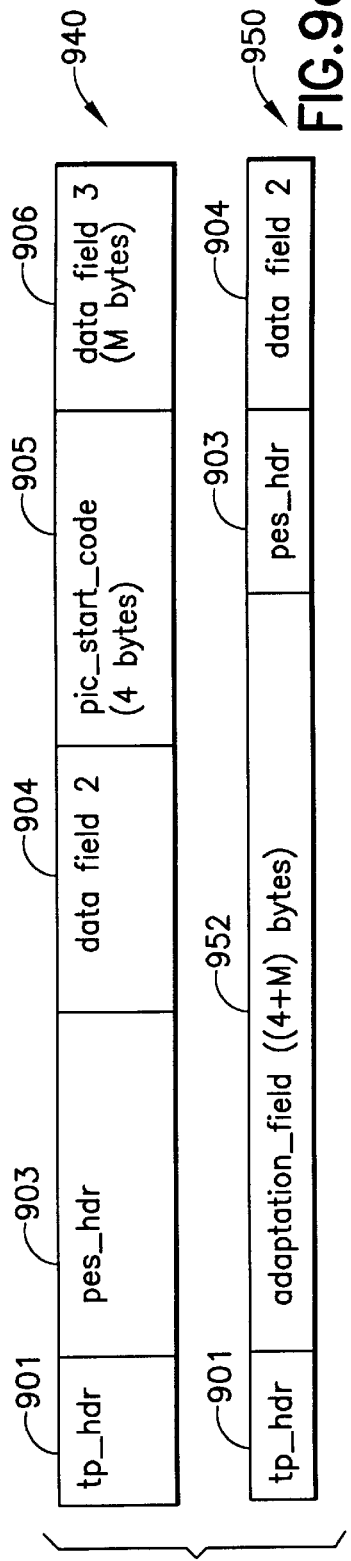

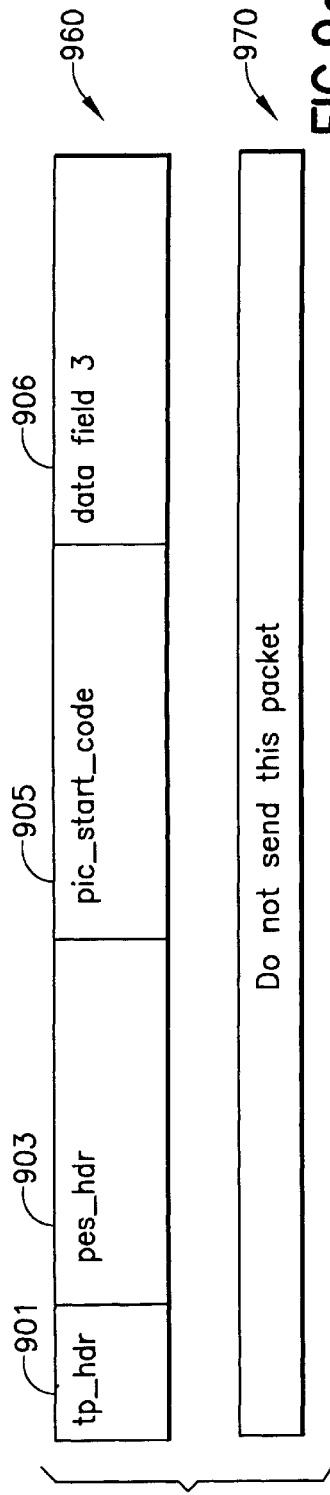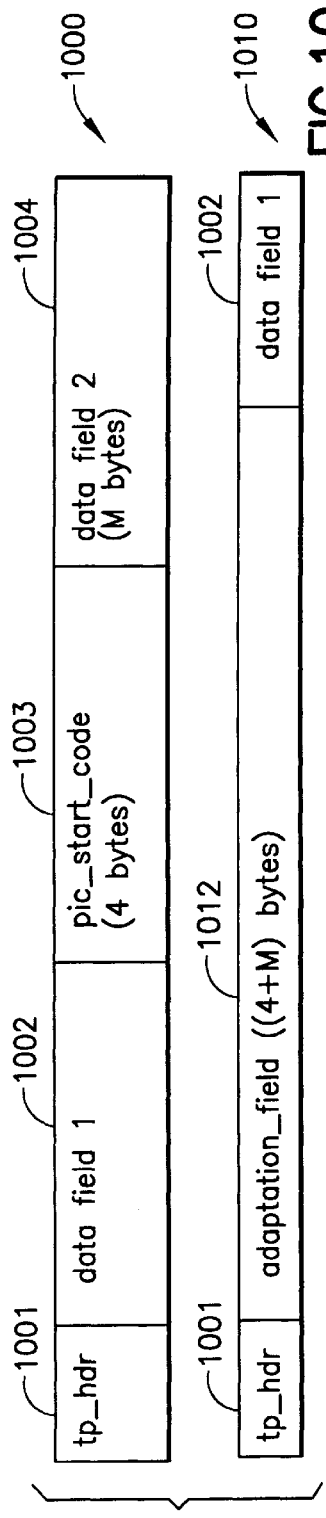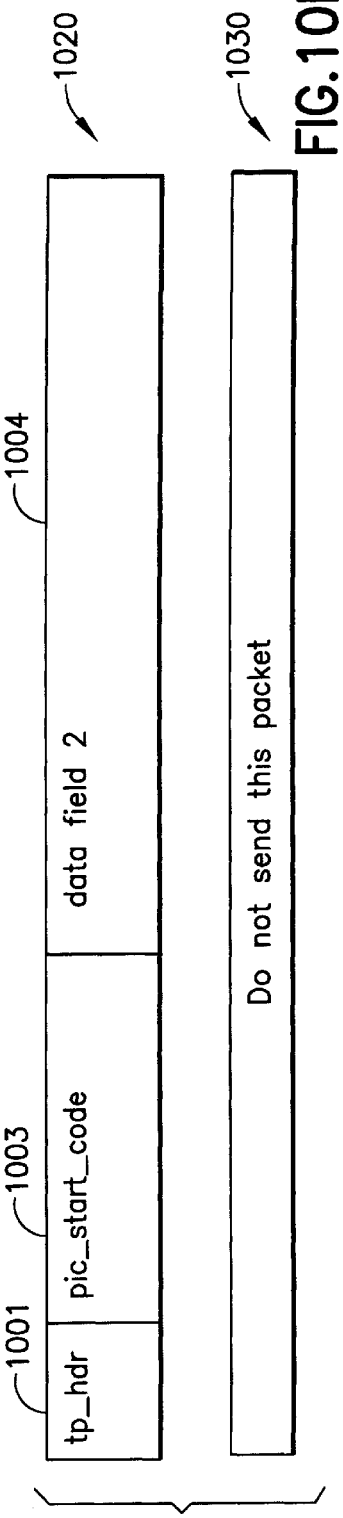

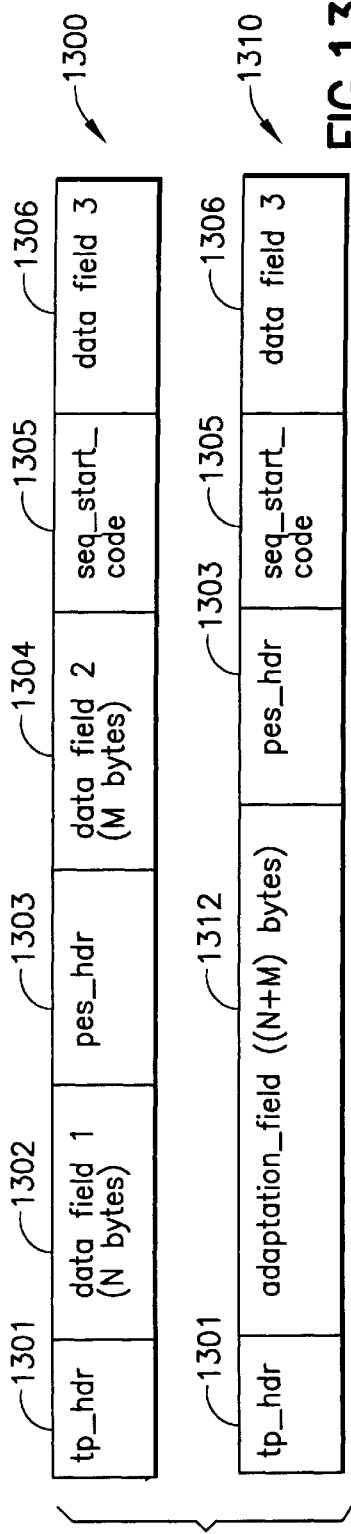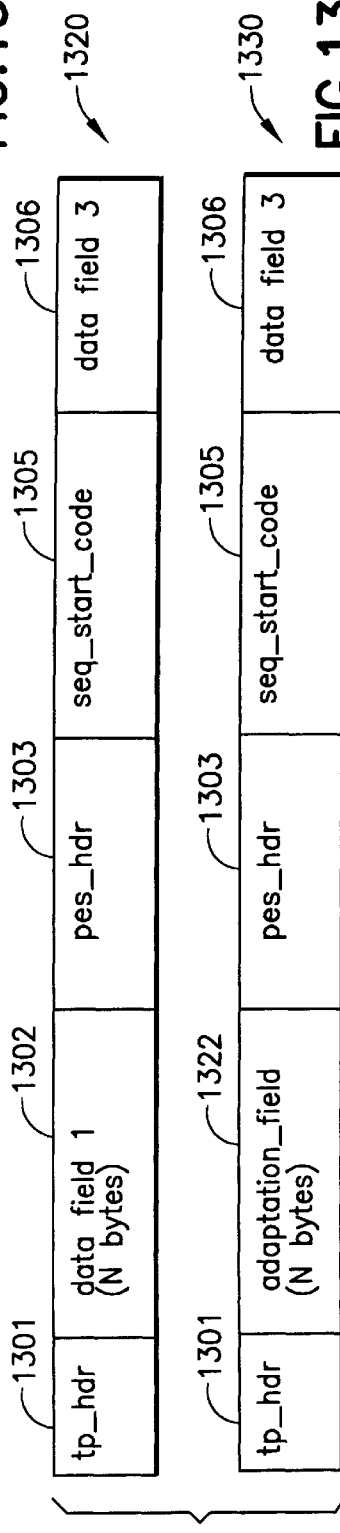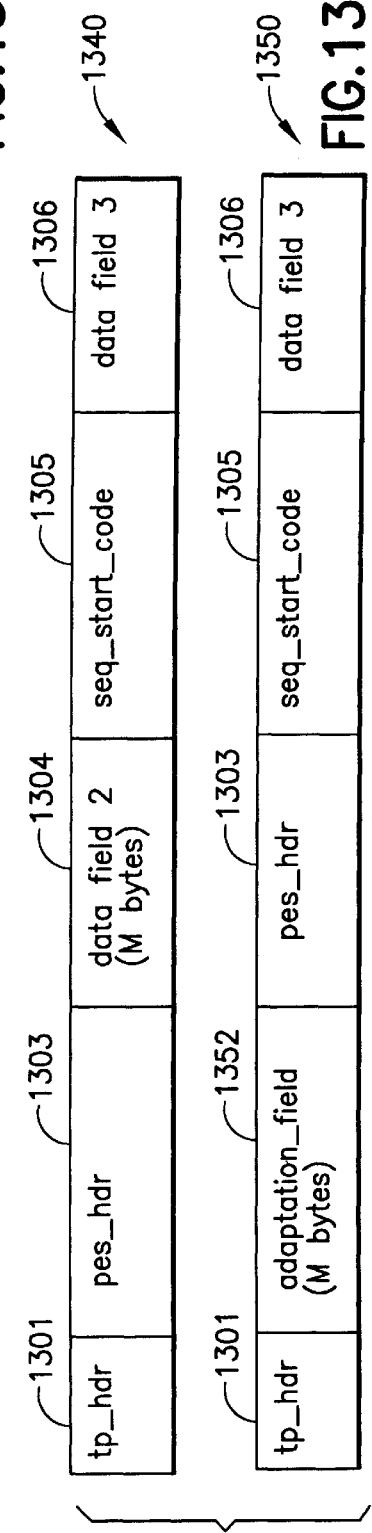

SPLICING COMPRESSED PACKETIZED DIGITAL VIDEO STREAMS

BACKGROUND OF THE INVENTION

The present invention relates to the communication of digital video signals, and more particularly, to the insertion of digital video messages such as commercials into a pre-existing compressed packetized data stream. Data packets of the commercial message are spliced into a pre-existing data stream (complying, e.g., with the Moving Picture Experts Group (MPEG) transmission standard) without decompressing the data in the data stream, and while maintaining compliance with the MPEG or similar digital data communication protocol.

Digital transmission schemes are particularly advantageous for signals that are broadcast from a main office by satellite to a cable television affiliate at a system headend. At the system headend, the digital data stream may be further processed and distributed to the cable system customers, for example, via a Hybrid Fiber Coax (HFC) or Fiber to the Curb (FTTC) network. Such an arrangement is known as an end-to-end digital network since digital video is compressed and transmitted from a programming source at a central office all the way to each customer's home. In an HFC network, a distribution line includes both a coaxial cable which carries radio-frequency signals, and an optical fiber which carries light wave signals. In a FTTC network, an optical fiber carries the data stream from the cable system headend to a neighborhood transfer point, or drop, and conventional coaxial cable carries the signal from the drop to the customer's home. At the customer's home, a decoder processes the digital signal to provide a signal for display on a television or other display device.

In such cable distribution systems, the received data stream may be processed at the headend prior to distribution to the system customers. In particular, commercial messages from local businesses may be inserted into the main programs. However, in order to accomplish this, conventionally the received digital data stream must be completely demodulated, demultiplexed, decrypted, decompressed and decoded to recover the signal in the analog domain. Then, the desired commercial message is provided in the analog domain and inserted into the signal to provide a new analog combined signal. Finally, the analog combined signal is digitized, encoded, compressed, encrypted, multiplexed and modulated for transmission to a customer's home. As can be seen, this process leaves much to be desired as it requires a number of time-consuming steps that must be implemented with additional hardware, including magnetic tape recorders and players. Moreover, a large magnetic tape library must be maintained and indexed. Furthermore, the conversion from digital to analog and back to the digital domain may result in degradation of the signal quality.

Thus, it would be desirable to provide a system for allowing an auxiliary compressed digital signal such as a commercial message to be inserted into a compressed digital signal of a main program without requiring decompression of the data in the main program signal. Such a system should allow cable system headed operators to conveniently insert commercial messages into a main program which is received, for example, via a nationwide or international satellite distribution network. Additionally, the system should not degrade the quality of the main program. In particular, the system should avoid any discontinuity which results in a non-compliant data stream. The system should also preclude problems such as syntax violations, decoding errors, buffer overflow or underflow, timing recovery problems due to discontinuous system time stamps, audio/video synchronization problems, and video display artifacts. Furthermore, the system should be compatible with MPEG and similar digital data communication standards, in addition to being fully compatible with existing decoder technology. The present invention provides a system having the above and other advantages.

SUMMARY OF THE INVENTION

In accordance with the present invention, a method and apparatus are presented for splicing a secondary packetized data stream, such as a commercial, with a primary packetized data stream, such as a network television program. Advantageously, the system does not require the decompression of the data in the primary data stream, and is particularly suitable for use at a cable system headend.

A start signal is provided to indicate the time to initiate the splicing, that is, when to insert the commercial. The start signal may be embedded as data in the main program, in which case it must be recovered. Alternatively, the cable system operator may provide an external time signal. In either case, once the start signal has been received, a pre-splicing packet of the primary stream is determined. Normally, the pre-splicing packet is the packet closest to the start time which carries an anchor frame start code. The anchor frame start code indicates that data of an I or P frame is carried in the packet. Typically, such a packet may carry data from the I (or P) frame, and the frame which immediately precedes the I (or P) frame. To prevent a potential discontinuity at the decoder, the pre-splicing packet is processed to discard the anchor frame data, and to insert a number of stuffing bytes which is equal to the number of bytes discarded into an adaptation field of the pre-splicing packet. An adaptation field is created if it does not already exist.

Additionally, to maintain continuity at the decoder, identifying data of the primary stream such as PID and PSI data, is retrieved and provided to the secondary stream.

Furthermore, it may be necessary to insert a number of null packets into the output stream at the transition point between the main program and the commercial. In particular, a number L of null packets are provided in the output stream to prevent a buffer overflow at a decoder which receives the output stream. The null packets are inserted between the pre-splicing packet of the main program and the first packet of the commercial. Similarly, when there is a transition back from the commercial to the main program, additional null packets may be inserted. The number L is determined according to the data rates of the primary and secondary streams, and provides a corresponding padding delay time which reduces the decoder's buffer level.

Also, at the transition back from the commercial to the main program, a post-splicing packet of the main program which follows the pre-splicing packet is determined. Typically, the post-splicing packet will have a sequence start code which follows the sequence end code which is associated with the last packet of the commercial. The post-splicing packet is positioned to follow the last packet of the commercial in the output stream. Moreover, processing of the post-splicing packet is analogous to processing of the pre-splicing packet. Specifically, data in the post-splicing packet which is associated with an immediately preceding packet, which may or may not be the same as the pre-splicing packet, is discarded to prevent a discontinuity at the decoder. Moreover, an amount of stuffing data is added to an adaptation field of the post-splicing packet based on the amount that was discarded. An adaptation field is created if it does not already exist.

A corresponding apparatus, including an insertion processing module, is also presented.

A decoder is also presented for decoding a transport data stream which comprises a main program and a commercial. The decoder includes a buffer for storing the transport data. The buffer has a size that is modeled at the insertion processing unit by a virtual buffer scheme. A processor is coupled to receive data from the buffer for processing to provide a signal which is routed to a television for display of the main program and the commercial, in turn. A number L of null packets are provided between a pre-splicing packet of the main program and a first packet of the commercial to prevent overflow of the buffer. In particular, the number L is determined according to the respective data rates of the main program and the commercial. Additionally, L may be determined according to a decoding delay time of the decoder, and according to a padding delay which prevents a decoding discontinuity. The decoder provides a signal for display on a display device such that a transition between the main program and the commercial, and back again, is substantially seamless.

BRIEF DESCRIPTION OF THE DRAWINGS

FIGS. 6a to 6c are diagrammatic illustrations showing how variable length PES packets are reorganized into fixed length transport packets for use in providing a transport multiplex for transmission.

FIGS. 7a–7d show a pre-splicing data packet having an adaptation field and PES header before and after processing in accordance with the present invention.

FIGS. 8a and 8b show a pre-splicing data packet having an adaptation field but no PES header before and after processing in accordance with the present invention.

FIGS. 9a–9d show a pre-splicing data packet having no adaptation field but with a PES header before and after processing in accordance with the present invention.

FIGS. 10a and 10b show a pre-splicing data packet having no adaptation field or PES header before and after processing in accordance with the present invention.

FIGS. 13a–13d show a post-splicing data packet having no adaptation field but with a PES header before and after processing in accordance with the present invention.

DETAILED DESCRIPTION OF THE INVENTION

A method and apparatus are presented for splicing a secondary packetized data stream, such as a commercial, with a primary packetized data stream, such as a network television program.

Figure 1:
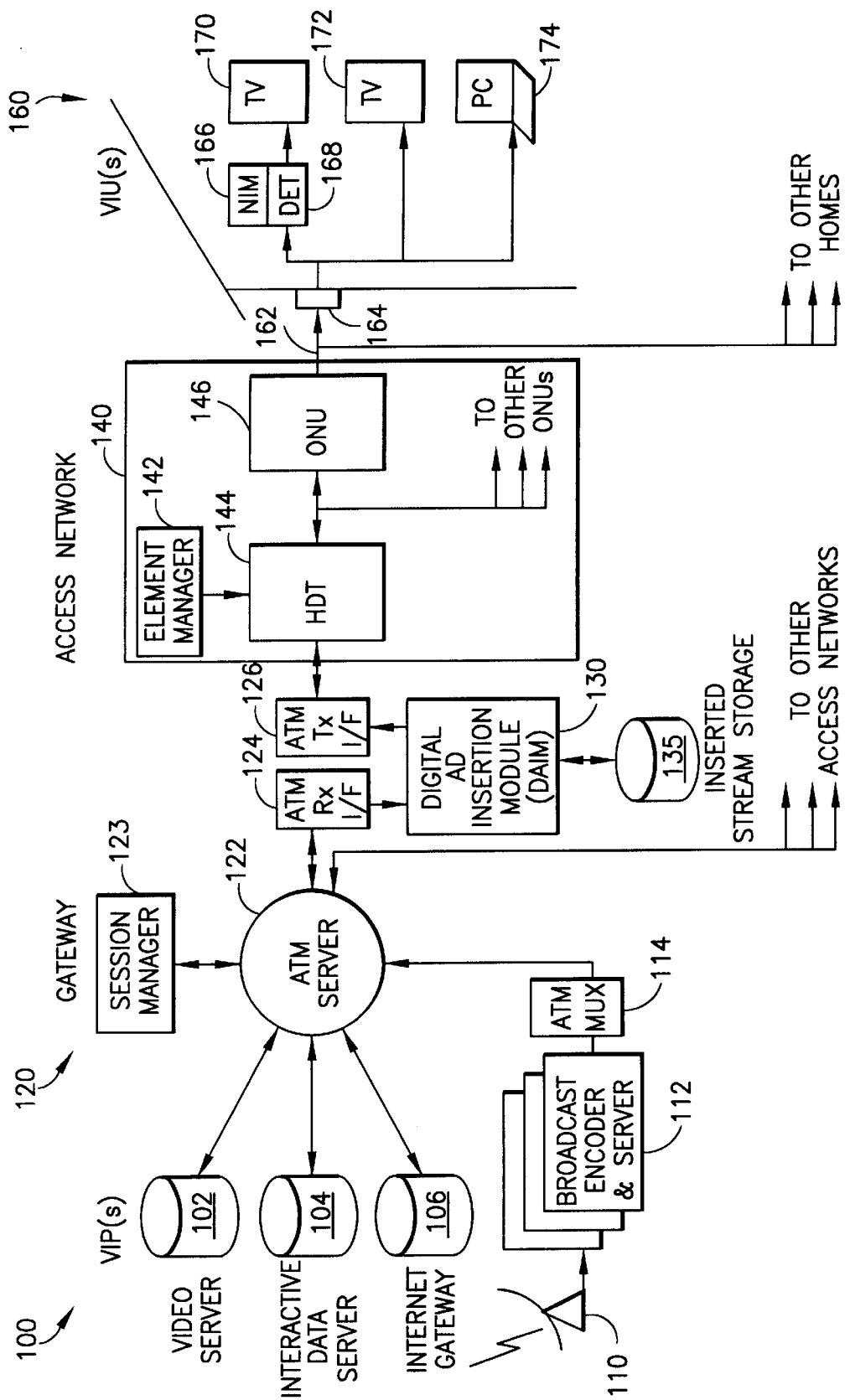
FIG. 1 is a block diagram of a Fiber-to-the-Curb Digital Video Distribution Network in accordance with the present invention.

FIG. 1 is a block diagram of a Fiber-to-the-Curb Digital Video Distribution Network in accordance with the present invention. The distribution network includes Video Information Providers (VIPs) shown generally at 100, a gateway, shown generally at 120, an access network, shown generally at 140, and the home of a Video Information User (VIU), shown generally at 160. The gateway 120 may comprise an L1 Gateway manufactured by Teleco. The VIPs may include a video server 102, an interactive data server 104, and an internet gateway 106, all of which communicate with an asynchronous transfer mode (ATM) network 122 via, for example, an OC-3 system, where optical fiber is used to transmit data at 155.52 Mbit/sec. The ATM network 122 may also receive data via a satellite receiving antenna 110, broadcast encoder and server 112, and ATM multiplexer 114. The ATM network 122 communicates with a session manager 123.

The ATM network 122 may provide information to one or more access networks, such as a cable television distribution headend 140. First, however, the information from the ATM network is processed via a Digital Ad Insertion Module (DAIM) 130 in accordance with the present invention. Information, such as a network television program, passes between the ATM network 122 and the DAIM 130 via an ATM receiver (Rx) interface (I/F) 124. The DAIM 130 receives the information as a compressed digital packetized data stream and accesses an inserted stream storage unit 135. The storage unit may include a digitized library of advertisements (e.g., commercials) which are available to insert into the network television program. The storage unit 135 may include digital audio tapes (DATs), digital video disks (DVDs), compact audio discs (CDs) or other magnetic or optical storage media.

In accordance with the present invention, the DAIM 130 inserts a compressed digital packetized advertisement stream into the compressed digital packetized data stream of the network television program without decompressing the program. Moreover, when the television program is in an MPEG-2 or similar format, the DAIM maintains compliance with the MPEG-2 protocol. Of course, while the embodiment of FIG. 1 is particularly suited for the insertion of advertisements into a network television program, there are many other useful applications, including the insertion of educational programming, emergency messages such as weather bulletins, informational messages from the cable system operator, and the like. Furthermore, audio only or data only messages may be inserted into the main packetized data stream. Moreover, the same message may be inserted into more than one main program at the same time, and different messages may be inserted into different main programs at the same time.

A compressed digital packetized data stream which includes the inserted message combined with the main program is output from the DAIM 130 to an ATM transmitter (Tx) interface 126, and then provided to an access network (e.g., cable system headend) 140. In the access network 140, a Host Digital Terminal (HDT) 144 receives the data stream and also receives control signals from an element manager 142, which manages the cable network. The HDT 144, which is a specialized digital switch which is typically located in a head office of the cable system, communicates with one or more Optical Node Units (ONUs), including ONU 146. The ONU is located in the local curb, and supports an optical to electrical conversion and modulation/demodulation. The ONU 146 then provides the data stream over a coax distribution network to one or more subscriber's homes or offices. At each home, a drop box 164 located near the home receives the combined digital signal and provides it to a Digital Entertainment Terminal (DET) (e.g., decoder) 168 and a Network Interface Module (NIM) 166. The DET decodes the packetized data stream, and the signal is seamlessly delivered for display to the Video Information User (VIU) (e.g., subscriber) via televisions 170, 172 and/or personal computer 174.

Figure 2:
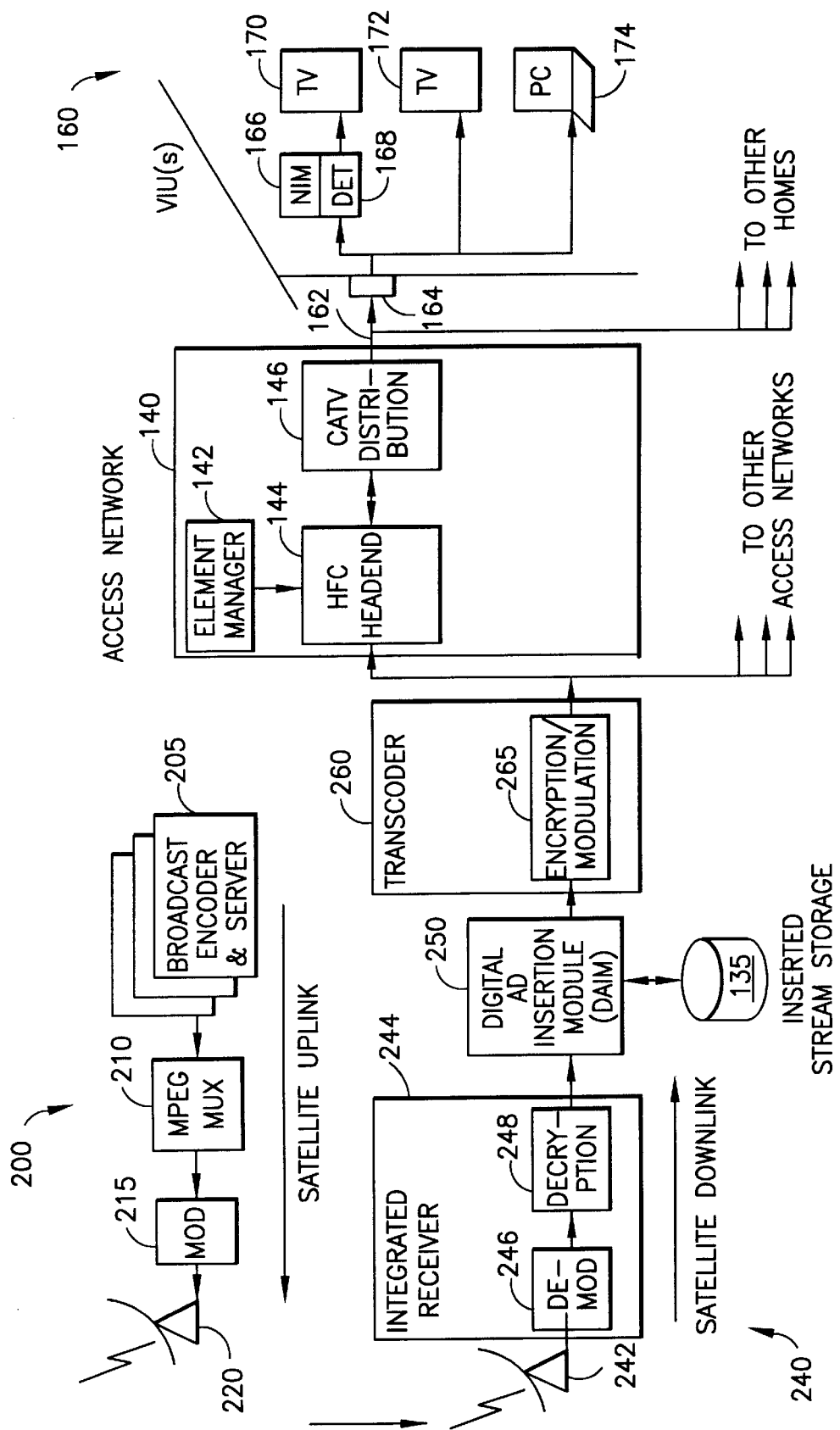
FIG. 2 is a block diagram of a Hybrid Fiber Coax Digital Video Distribution Network in accordance with the present invention.

FIG. 2 is a block diagram of a Hybrid Fiber Coax Digital Video Distribution Network in accordance with the present invention. Like-numbered elements correspond to the elements of FIG. 1. The distribution network includes a satellite uplink, shown generally at 200, a satellite downlink, shown generally at 240, an access network 140 and a VIU's home 160. The satellite uplink 200 includes a broadcast encoder and server 205, which may also perform an encryption function, an MPEG multiplexer 210, a modulator 215, and a transmitting antenna 220. The satellite downlink 240 includes a receiving antenna 242, and an integrated receiver 244. The signal received at the antenna 242 typically comprises a multiplex of encrypted channels (e.g., one hundred or more channels) from various programming service providers. The received multiplexed signal is processed at the integrated receiver 244 by a demodulator 246 and decryption function 248.

The recovered multiplex of channels is then provided to the DAIM 250 for processing in accordance with the present invention. The DAIM accesses an inserted stream storage unit 135 to retrieve a compressed digital packetized message for insertion into one or more main channels of the multiplex. After processing by the DAIM, the one or more combined signals are received by a transcoder 260 for encryption and/or modulation at function 265, as well known in the art. The multiplex of signals, including the signal with the inserted messages, is then received by the access network 140 and transmitted to the subscribers' homes for display at the VIU's home 160 as discussed in connection with FIG. 1.

Figure 3:
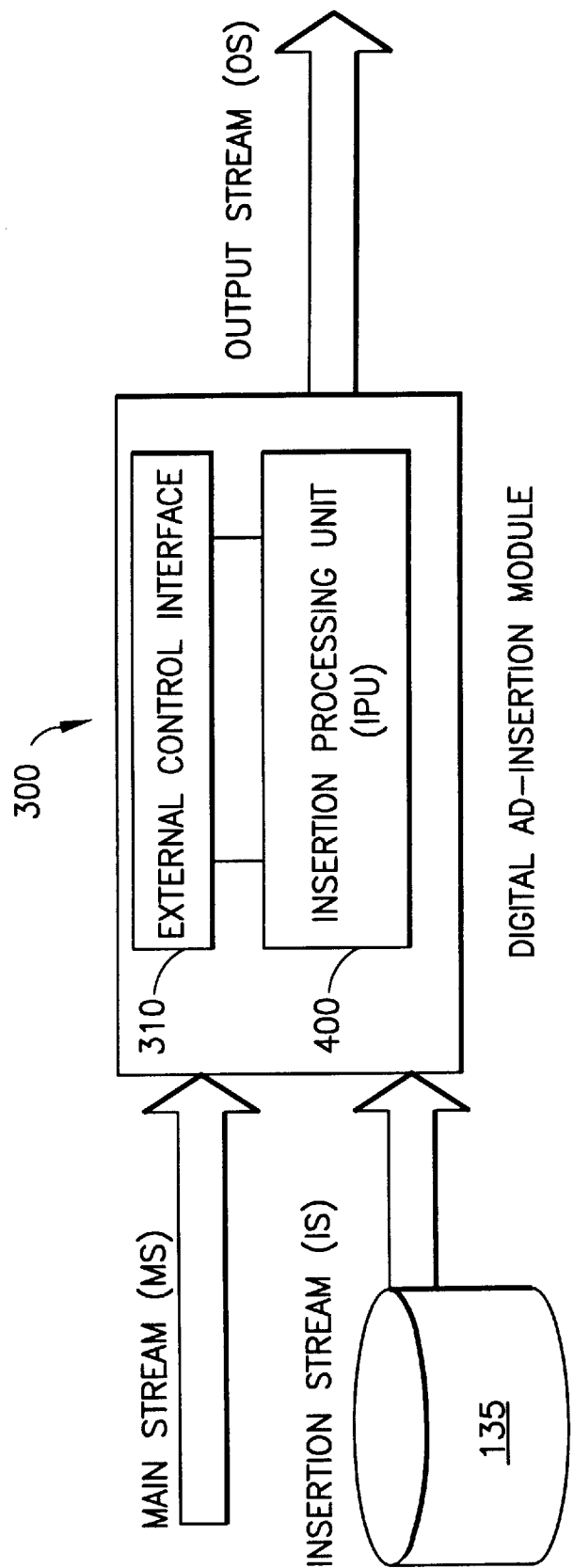
FIG. 3 is a block diagram of a Digital Ad Insertion Module in accordance with the present invention.

FIG. 3 is a block diagram of a Digital Ad Insertion Module (DAIM) in accordance with the present invention. Advantageously, the DAIM 300 is compatible with existing communication networks, including the Fiber-to-the-curb network of FIG. 1, and the Hybrid Fiber Coax network of FIG. 2. The DAIM receives a main stream (MS) which comprises a primary data stream such as a network television program, and an insertion stream (IS), which comprises a secondary data stream such as a commercial message. Within the DAIM, an external control interface 310 communicates with an Insertion Processing Unit (IPU) 400. After the commercial message is inserted into the main stream, an output stream is produced.

Figure 4:
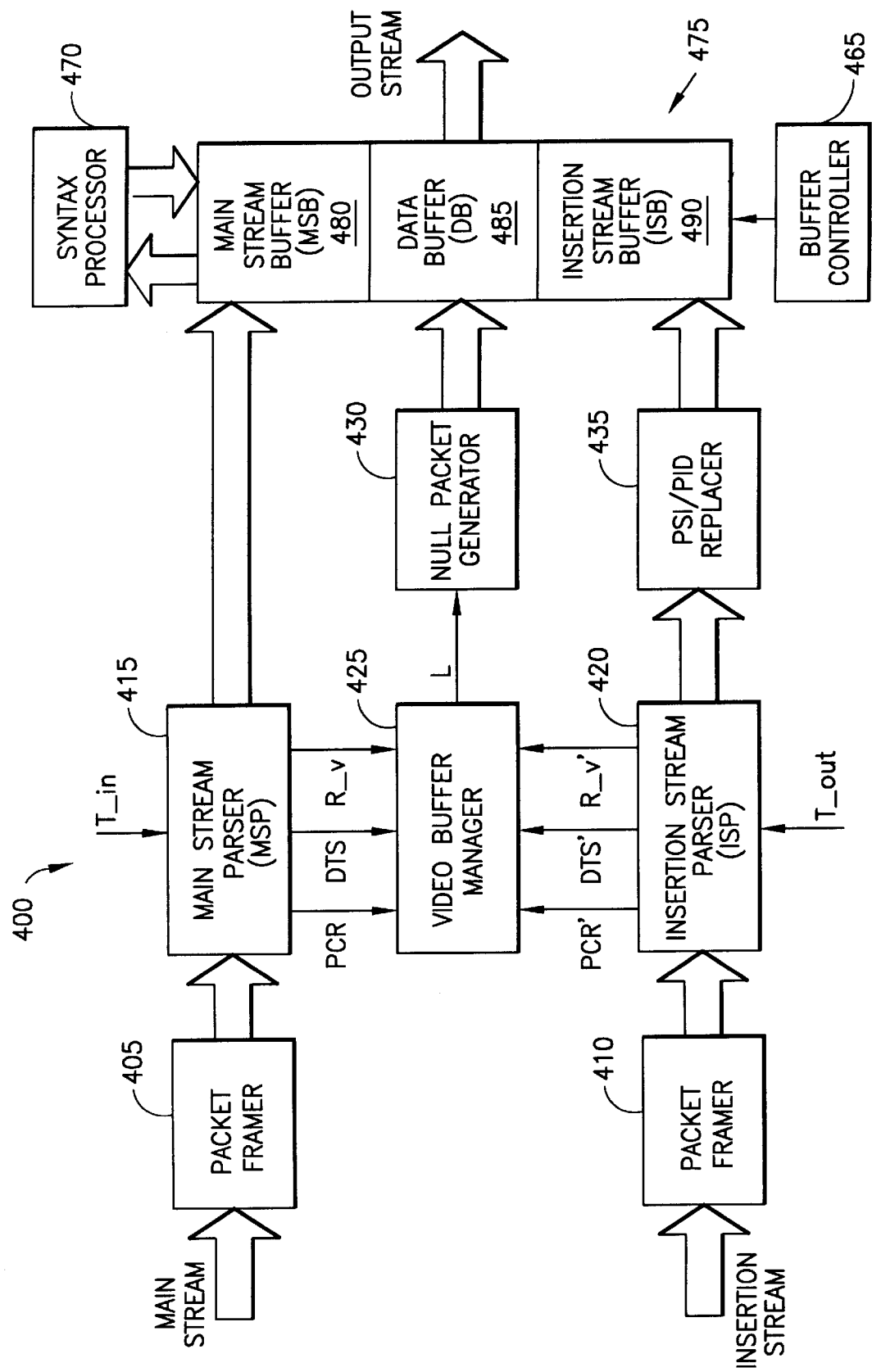
FIG. 4 is a block diagram of an Insertion Processing Unit of a Digital Ad Insertion Module in accordance with the present invention.

FIG. 4 is a block diagram of an Insertion Processing Unit (IPU) of a Digital Ad Insertion Module in accordance with the present invention. The IPU, shown generally at 400, receives the main stream at a packet framer 405, while the insertion stream is received at another packet framer 410. After processing by the packet framer 405, the main stream is provided to a Main Stream Parser (MSP) 415. The MSP also receives an input labeled T_in, which is the desired starting time of the insertion of the insertion stream into the main stream. Similarly, after processing by the packet framer 410, the insertion stream is provided to an Insertion Stream Parser (ISP) 420. The ISP also receives an input labeled T_out, which is the desired ending time of the insertion of the insertion stream into the main stream. T_in may be carried in the main stream, or it may be provided locally, such as at the cable system headend. Similarly, T_out may be carried in the main stream, insertion stream, or may be generated locally.

The main stream parser 415 parses the data packets of the main stream and provides signals to a video buffer manager 425. These signals include a Program Clock Reference (PCR), a Decoding Time Stamp (DTS), and a video bit rate, R_v, for the main stream. Similarly, the insertion stream parser 420 parses the data packets of the insertion stream to provide PCR', DTS' and R_v' signals to the video buffer manager 425, where the prime notation indicates a parameter of the insertion stream. The video buffer manager 425 uses the input signals to determine a number, N, of null packets which will be inserted into the output data stream. In particular, to avoid a decoder buffer overflow, it may be necessary to add null packets to the output stream during the transition from the main to the insertion stream, and during the transition from the insertion to the main stream, if the insertion stream has a higher data rate than the main stream. The number of null packets is provided to a null packet generator 430 and then to a Data Buffer (DB) 485 which is part of an output buffer 475. The DB 485 communicates with a syntax processor 470.

The main stream parser 415 provides the main stream data to a main stream buffer 480, which communicates with a syntax processor 470. The main stream buffer 480 is part of the output buffer 475. The insertion stream parser 420 provides the insertion stream data to a Program Specific Information (PSI)/Program Identifier (PID) Replacer 435, which replaces the PSI tables and PIDs of the insertion stream with those of the main stream. The PSI/PID replacer 435 retrieves the relevant information from the main stream using a communication path which is not shown. The PSI and PID data of the main stream provide the information to connect the various audio, video, and data packets to a particular programming service. Specifically, this is accomplished using a Program Association Table (PAT) and a Program Map Table (PMT). The insertion stream is then provided to an Insertion Stream Buffer (ISB) 490, which is part of the output buffer 475. The ISB 490 communicates with a syntax processor 470. Furthermore, the output buffer 475 receives commands from a buffer controller 465 to provide an output stream with the insertion stream seamlessly spliced into the main stream.

Further details of the various elements of the insertion processing unit 400 of FIG. 4 will now be discussed. The following terms and variables will be used:

IPU: Insertion Processing Unit—a unit inside the Digital Ad-Insertion Module.

Main Stream (MS): The incoming digital stream that carries the normal digital video programming services.

Insertion Stream (IS): The digital stream segment that will be inserted into the main stream.

Output Stream (OS): The outgoing main stream after insertion.

T_in: The external signal indicating the desired starting time of the insertion in the main stream.

T_out: The external signal indicating the desired ending time of the insertion in the main stream.

sp_in: The insertion starting position, or splicing start point, in the main stream. It is generated internally by the DAIM, and is not necessarily coincident with T_in.

sp_out: The insertion ending position, or splicing end point, in the main stream. It is generated internally by the DAIM, and is not necessarily coincident with T_out.

sp_in': The starting position of the insertion segment in the insertion stream.

sp_out': The ending position of the insertion segment in the insertion stream.

MPEG: Moving Picture Experts Group for video, audio and system coding format.

TS: The MPEG Transport Stream which uses the 188 byte packet format.

Null Packet: A transport packet that does not contain any valid audio/video data.

L: Number of null packets.

PID: The Program IDentifier carried in each MPEG transport packet indicating the presence of a data stream.

PSI: Program Specific Information carried in the transport packet indicating the mapping of a group of PIDs to individual programs. It includes PAT/PMT.

PES: Packetized Elementary Stream is a layer of data carried by the TS.

ES: Elementary Stream—can be video, audio, or data.

PCR: Program Clock Reference—system clock time stamps which are carried in the main stream.

PCR': Program Clock Reference—system clock time stamps which are carried in the insertion stream.

DTS: Decoding Time Stamps indicating the decoding time of each ES element in the main stream.

DTS': Decoding Time Stamps indicating the decoding time of each ES element in the insertion stream.

R_v: Video bit rate for the main stream.

R_v': Video bit rate for the insertion stream.

Sequence Header: The highest layer of header in a MPEG video stream.

GOP Header: Group of Pictures header—the second layer of header followed by a complete self-contained sequence of pictures (e.g., frames).

Picture Header: The header which precedes each picture.

I Picture: Intra-coded picture that can be decoded without referring to another picture.

P Picture: Forward predicted picture that can be decoded using the previous decoded I or P picture.

Anchor Picture: I or P pictures are anchor pictures since they may be used as a reference to predict another picture.

B Picture: Bi-directionally predicted picture that can be decoded using the previous and next I or P decoded picture. Cannot be used as an anchor picture.

vbv_Buffer: Virtual Buffer Verifier (VBV)—a conceptual decoder channel buffer that shall not overflow or underflow.

R_t: Transport stream data rate.

The IPU 400 can process a main transport stream that includes one or more programs (e.g., channels). If the main stream carries only a single program, the IPU inserts the insertion stream into the main stream. Note that the terms "insertion stream," "secondary stream," or the like as used herein can denote replacement (e.g., overwriting) of packets of the main stream as well as insertion without loss of any main stream packets. However, this latter case will require a large amount of memory to store the portion of the main stream which is temporarily suspended while the insertion stream is transmitted.

If the main stream carries a plurality of programs, the IPU can insert the packets of the insertion stream into transport packets in the main stream that belong to one or more selected programs. In this case, the data rate of each elementary stream in the insertion stream should be the same as the data rate of the corresponding programs in the main stream. For example, the rate of a video elementary stream in the insertion stream should be equal to the rate of the video elementary main stream which is to receive the insertion data. The IPU processes the packets near the beginning and end of the insertion so the resulting stream is MPEG compliant.

The main stream packet framer 405 receives a fully compliant, unaligned MPEG-2 main transport stream at its channel input. The main stream data is in a serial format. The MPEG-2 transport packet synchronization byte may occur at any bit position. The packet framer 405 provides the transport packet alignment, and outputs a transport stream which is aligned to the packet boundary. The insertion stream packet framer 410 performs a similar function for the insertion stream.

The Main Stream Parser (MSP) 415 and Insertion Stream Parser (ISP) 420 are used to parse the main stream and insertion streams, respectively. The stream parsers parse the respective aligned streams of the packet framers 405 and 410 from the transport layer to the picture layer. At a time prior to T_in, the MSP 415 bypasses the main stream in its input and send the stream directly to the main stream buffer 480, and the ISP 420 parses the input insertion stream to locate the sequence start code. When a packet with a sequence start code is detected in the insertion stream, the ISP puts the address of this packet into a register (not shown). The address is a read address for the insertion stream.

As soon as T_in is detected, the MSP parses the main stream to locate the transport packet with the next, or most recent previous (if still available), anchor picture start code. When an I or P picture start code is found in the main stream transport packets, the MSP 415 sends the transport packet which contains the anchor picture start code (e.g., the last packet of the main stream) to the syntax processor 470 for processing. Also at this time, the ISP 420 sends the first packet of the insertion stream to the syntax processor 470 to be "fixed" or "repaired", as discussed below in greater detail. When a video buffer verifier (e.g., MPEG parameter "vbv_buffer") management is required, the MSP 415 and ISP 420 will also have to parse the PCR, DTS, video rate R_v or R_v', and other parameters as required, store them in the data buffer 485, and provide them to the video buffer manager 425.

The VBV is a hypothetical decoder which is conceptually connected to the output of an encoder. Coded data is placed in the buffer at the constant bit rate that is being used, and is removed according to which data has been in the buffer for the longest period of time. The bitstream produced by an encoder or editor must not cause the VBV to either overflow or underflow. The MSB 415 and ISB 420 output the same transport stream which appeared at the input after parsing as discussed.

At the time T_out, the operation of the MSP and ISP is similar to the T_in point, except that the main stream and insertion stream are interchanged. That is, after the insertion stream has been inserted into the main stream, the main stream must be coupled with the end of the insertion stream. To accomplish this, as soon as T_out is detected, the ISP will parse the insertion stream to locate the transport packet with the next, or most recent previous (if still available), anchor picture start code. When an I or P picture start code is found in the insertion stream transport packets, the ISP 420 sends the transport packet which contains the anchor picture start code (e.g., the last packet of the insertion stream) to the syntax processor 470 for processing. Also at this time, the MSP 415 sends the first packet of the remainder of the main stream to the syntax processor 470 for processing. In this manner, the transition from the end of the insertion stream to the beginning of the remainder of the main stream can be performed seamlessly.

The video buffer manager 425 checks for the fullness of the video buffer according to its inputs, PCR, PCR', DTS, DTS', and video data rates R_v and R_v'. In case of a potential buffer overflow, it instructs the null packet generator 430 to generate L null packets and insert the packets into the output stream. The number of packets to generate is stored in a register.

The syntax processor 470, which can communicate with the MSB 480, DB 485 and ISB 490 of the output buffer 475, processes the last packet before the splicing point and the first packet after the splicing point to provide a seamless transition that is MPEG compliant. At T_in, the syntax processor 470 reads the last transport packet from the main stream and the first packet from the insertion stream. It checks the syntax of the packets and repairs them, if necessary, so that they will be MPEG compliant, as will be discussed below in greater detail. At T_out, the syntax processor 470 operates in the similar way except that the main stream and insertion stream are interchanged. That is, the syntax processor 470 will read the last transport packet from the insertion stream and the first packet from the main stream, and then check the syntax of the packets and repair them, if necessary. Thus, the syntax processor 470 receives unfixed packets and addresses for the unfixed packets, and outputs fixed packets.

In the event of potential buffer overflow, the null packet generator 430 is instructed by the video buffer manager to generate null packets and insert them to the output. Thus, the null packet generator 430 receives a signal to generate null packets, and the number L of packets to generate, and outputs null packets.

It is desired that the PIDs of the resulting output stream do not change after the insertion. Accordingly, a PSI/PID replacer 435 is provided to replace the PSI tables and PIDs of the inserted stream with those of the main stream. The PSI/PID replacer 435 receives transport packets with the old PSI/PID, new PSI tables, and a PID conversion table, and outputs transport packets with the PSI/PID replaced.

The output buffer 475 is divided into three parts. The Data Buffer (DB) 485 is used to store common data such as PSI and null packets. The Main Stream Buffer (MSB) 480 and Insertion Stream Buffer (ISB) 490 are used to store the main stream and insertion stream, respectively.

A buffer controller 465 is used to coordinate the read and write operations of the DB, MSB, and ISB. It also performs addressing and output scheduling of each transport packet stored in the MSB, ISB and DB.

A group of registers (not shown) is used in the system for storing various parameters such as packet addresses and N, the number of null packets. A map of registers which may be used in accordance with the present invention is given in Table 1, below. It should be appreciated that Table 1 is an example only, and any other suitable map could be used. In Table 1, the first column indicates the register index, the second column indicates the number of bits, the third column indicates whether read (R) and/or write (W) capability is required, and the fourth column describes the function of the register location.

TABLE 1

| Index | Bits | R/W | Description |
|---|---|---|---|
| 1 | 7:0 | R,W | Read address for main stream |
| 2 | 7:0 | R,W | Read address for main stream |
| 3 | 7:0 | R,W | Read address for main stream |
| 4 | 7:0 | R,W | Read address for main stream |
| 5 | 7:0 | R,W | Write address for main stream |
| 6 | 7:0 | R,W | Write address for main stream |
| 7 | 7:0 | R,W | Write address for main stream |
| 8 | 7:0 | R,W | Write address for main stream |
| 9 | 7:0 | R,W | Read address for insertion stream |
| 10 | 7:0 | R,W | Read address for insertion stream |
| 11 | 7:0 | R,W | Read address for insertion stream |
| 12 | 7:0 | R,W | Read address for insertion stream |
| 13 | 7:0 | R,W | Write address for insertion stream |
| 14 | 7:0 | R,W | Write address for insertion stream |
| 15 | 7:0 | R,W | Write address for insertion stream |
| 16 | 7:0 | R,W | Write address for insertion stream |
| 17 | 7:0 | R,W | PCR of current stream |
| 18 | 7:0 | R,W | PCR of current stream |
| 19 | 7:0 | R,W | PCR of current stream |
| 20 | 7:0 | R,W | PCR of current stream |
| 21 | 7:0 | R,W | PCR of current stream |
| 22 | 7:0 | R,W | PCR of current stream |
| 23 | 7:0 | R,W | DTS of current stream |
| 24 | 7:0 | R,W | DTS of current stream |
| 25 | 7:0 | R,W | DTS of current stream |
| 26 | 7:0 | R,W | DTS of current stream |
| 27 | 7:0 | R,W | DTS of current stream |
| 28 | 7:0 | R,W | Address for PAT |
| 29 | 7:0 | R,W | Address for PAT |
| 30 | 7:0 | R,W | Address for PAT |
| 31 | 7:0 | R,W | Address for PAT |
| 32 | 7:0 | R,W | Size of PAT in number of packets |
| 33 | 7:0 | R,W | Address for PMT |
| 34 | 7:0 | R,W | Address for PMT |
| 35 | 7:0 | R,W | Address for PMT |
| 36 | 7:0 | R,W | Address for PMT |
| 37 | 7:0 | R,W | Size of PMT in number of packets |
| 38 | | | Interrupt register. |
| | 7 | R | SS, Splicing signal. 1: SS is detected; 0: splicing processing done |
| | 6 | R | MSD, 1: Main stream done |
| | 5 | R | ISD, 1: Insertion stream done |
| | 4 | R | NPD, 1: Null packets done |
| | 3 | R | APF, 1: Anchor picture found |
| | 2:0 | N/A | Reserved |
| 39 | 7:0 | R,W | Number of Null packets to generate |
| 40 | 7:0 | R,W | Stream output read address |
| 41 | 7:0 | R,W | Stream output read address |
| 42 | 7:0 | R,W | Stream output read address |
| 43 | 7:0 | R,W | Stream output read address |
| 44 | 7:0 | R,W | Main video elementary stream rate |
| 45 | 7:0 | R,W | Main video elementary stream rate |
| 46 | 7:0 | R,W | Main video elementary stream rate |
| 47 | 7:0 | R,W | Insertion video elementary stream rate |
| 48 | 7:0 | R,W | Insertion video elementary stream rate |
| 49 | 7:0 | R,W | Insertion video elementary stream rate |
| 50 | 7:0 | R,W | PID1 of main stream |
| 51 | 7:3 | R,W | PID1 of main stream |
| 51 | 7:0 | R,W | PID2 of main stream |
| 52 | 7:3 | R,W | PID2 of main stream |
| 53 | 7:0 | R,W | PID3 of main stream |
| 54 | 7:3 | R,W | PID3 of main stream |
| 55 | 7:0 | R,W | PID4 of main stream |
| 56 | 7:3 | R,W | PID4 of main stream |
| 57 | 7:0 | R,W | PID1 of insertion stream |

TABLE 1-continued

| Index | Bits | R/W | Description |
|---|---|---|---|
| 58 | 7:3 | R,W | PID1 of insertion stream |
| 59 | 7:0 | R,W | PID2 of insertion stream |
| 60 | 7:3 | R,W | PID2 of insertion stream |
| 61 | 7:0 | R,W | PID3 of insertion stream |
| 62 | 7:3 | R,W | PID3 of insertion stream |
| 63 | 7:0 | R,W | PID4 of insertion stream |
| 64 | 7:3 | R,W | PID4 of insertion stream |
| 65–68 | 7:0 | R,W | Read address for PID1 of insertion stream |
| 69–72 | 7:0 | R,W | Write address for PID1 of insertion stream |
| 73–76 | 7:0 | R,W | Read address for PID2 of insertion stream |
| 77–80 | 7:0 | R,W | Write address for PID2 of insertion stream |
| 81–84 | 7:0 | R,W | Read address for PID3 of insertion stream |
| 85–88 | 7:0 | R,W | Write address for PID3 of insertion stream |
| 89–92 | 7:0 | R,W | Read address for PID4 of insertion stream |
| 93–96 | 7:0 | R,W | Write address for PID4 of insertion stream |

The complexity of the IPU largely depends on the video buffer management scheme. Two implementations of a video buffer management scheme in accordance with the present invention are presented. First, in a simplified version, the number L of null packets for padding the output stream to prevent buffer overflow are provided only according to the video elementary stream data rates of the main and insertion stream, $R\_v$ and $R\_v'$, respectively. At T_in, the number of packets to pad with null data is computed as:

L=vbv_buffer_size * (1/R_v−1/R_v') * R_t/(188*8).

At T_out, the number of packets to pad is computed as:

L=vbv_buffer_size * (1/R_v'−1/R_v) * R_t/(188*8).

The advantage of this scheme is a simplified implementation, and there is no need to track the PCR and DTS of the stream. The disadvantages are that padding is larger than needed, and decoding or display discontinuities may result. Note that padding is required only when the insertion stream has a higher data rate than the main stream.

In a second, more complete version of the video buffer management scheme, padding is used according to a decoding delay of the main and insertion stream and the video elementary stream rates. The decoding delay is the difference between the time the first byte of a picture is received and the time when decoding is completed. With this scheme, at T_in, the number of packets to pad is computed as:

L=(decoding_delay−vbv_buffer_size/R_v') * R_t/(188*8).

At T_out, the number of packets to pad is computed as:

L=(decoding_delay−vbv_buffer_size/R_v) * R_t/(188*8).

The advantages of this second embodiment are that padding is used only as needed, and there is no chance of a decoding or display discontinuity caused by padding. A disadvantage is that the decoding delay must be computed, and therefore the PCR and DTS of the data stream must be retrieved and decoded. This requires additional hardware and expense.

With either of the above schemes, the calculation of the number of null padding packets can be computed using the following definitions and assumptions.

Definitions:
B0: Video decoding buffer size at the end of old stream.
vbv_buffer size: 1.75 Mb or 1835008 bit
T_pad: Duration of null padding bits.

At T_in point:
B0−R_v * T_pad+(R_v'−R_v)*(decoding_delay−T_pad) ≦vbv_buffer_size; and
T_pad≧decoding_delay* (1−R_v/R_v')−(vbv_buffer_size−B0)/R_v'.

Since B0=decoding_delay*R_v, we have:
T_pad≧decoding_delay−vbv_buffer_size/R_v'.
Since decoding_delay<vbv_buffer/R_v, to simplify the computation, T_pad can be written as:
T_pad≧vbv_buffer_size* (1/R_v−1/R_v').

For example, if R_v=4 Mbps and R_v'=8 Mbps, then the padding time will be:
T_pad=1835008 * (¼−⅛)=0.23 sec.

However, this does not mean that the viewer will detect a discontinuity of 0.23 second. In fact, there will be no visible discontinuity when the data is displayed on a television screen since the 0.23 second delay only flushes out part of the data in the video decoding buffer. After 0.23 second, the data from the insertion stream will fill the buffer while the decoder is still decoding the data from the main stream. As long as the time to decode the remaining data in the video decoding buffer is greater or equal to (vbv_delay_of_first_picture—1/picture_rate) of the insertion stream, there will be no decoding discontinuity.

Furthermore, at T_out, T_pad is computed as:
T_pad≧decoding_delay−vbv_buffer_size/R_v, or simplified to:
T_pad≧vbv_buffer_size* (1/R_v'−1/R_v)

The number of padding packets, N, can therefore be computed as:
L=T_pad * R_t/(188*8).

Figure 5:
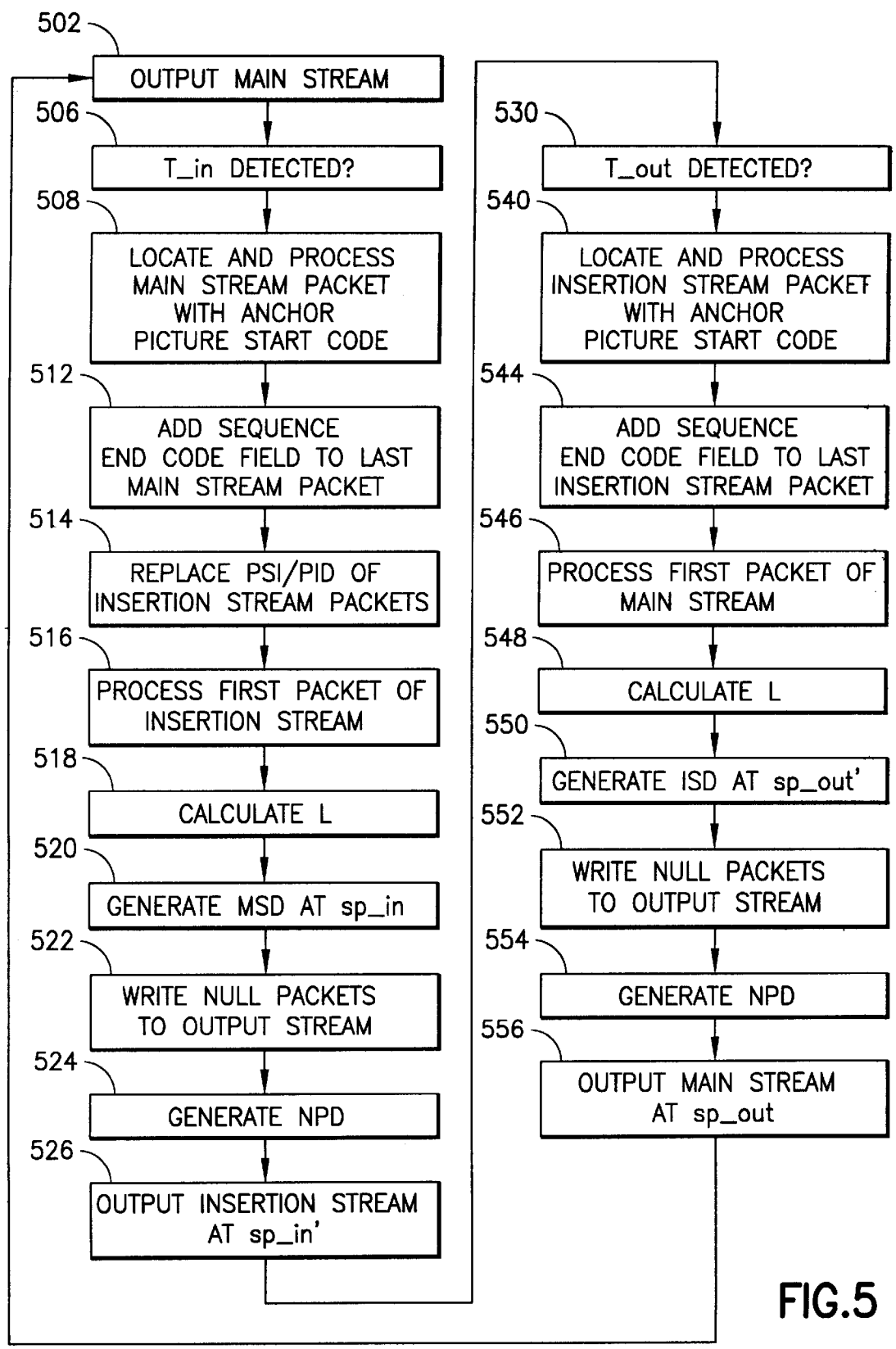
FIG. 5 illustrates the processing flow of the Insertion Processing Unit of FIG. 4 in accordance with the present invention.

FIG. 5 illustrates the processing flow of the Insertion Processing Unit of FIG. 4 in accordance with the present invention. Note that the steps of FIG. 5 are shown as occurring in a sequential manner for clarity, but many of the steps may occur concurrently and/or sequentially. At block 502, the IPU outputs the main transport stream from the main stream buffer (MSB) 480. The IPU is essentially in a bypass mode at this time since the insertion stream has not yet been inserted. At block 506, the main stream parser parses the main stream to locate the splicing signal T_in. Note that T_in need not be carried in the main stream, but may be provided locally, for example, at a cable system headend. When T_in is detected, the IPU continues to output the main transport stream from the main stream buffer. At block 508, the main stream parser parses the main stream to locate the closest packet with an anchor picture (e.g., I or P picture) start code and passes that packet to the syntax processor 470. This packet will be the last packet of the main stream. To ensure that the resulting data stream is MPEG compliant, no data from the next frame or sequence of frames may be included in this last main stream packet. At block 512, the syntax processor adds a sequence end code field to the last packet of the main stream. The sequence end code is a twenty-four bit code which indicates the end of a sequence of pictures. At block 514, the PSI/PID replacer 435 starts to replace the PSI/PID of the insertion stream.

At block 516, the syntax processor processes the first packet of the insertion stream (e.g., the packet which contains the sequence start code) so that any data before the sequence start code in this packet that is coming from the insertion stream is replaced with stuffing bytes in the adaptation field. If the adaptation field does not exist, it is created. The packet's transport header and PES header are also modified to ensure that the output stream is MPEG compliant. The syntax processor also sets the discontinuity indicators of the insertion stream in ISB for all the packets before the PCR packet to "1".

At block 518, the video buffer manager 425 calculates the number, N, of null packets to pad. At block 520, at the end of the main stream, which is designated as the position sp_in, an interrupt signal, Main Stream Done (MSD), is generated. At block 522, after receiving the MSD signal, the IPU reads the null packets from the data buffer 435 and writes the null packets to the output stream. At block 524, at the end of the null packets, an interrupt signal, Null Packets Done (NPD), is generated.

At block 526, after receiving the NPD signal, the system begins to output data from the insertion stream buffer 490 at a position which is designated sp_in'. At the same time, the MSP reads from the main stream and puts a new sequence in the MSB.

At block 530, when T_out is detected, the processing continues at block 540. Otherwise, the system is in a waiting mode until T_out is received. At this time, the system continues to output data from the ISB. Generally, T_out may be provided locally, for example, by a cable system headend. However, it may be preferable for T_in and T_out to be provided in the main stream so that the cable headend is not tasked with managing the time and duration of the insertion. Moreover, the gap in the main stream in which the insertion stream is to be provided will not typically be controllable by the cable headend. At block 540, the ISP parses the insertion stream for the packet with an anchor picture start code and passes that packet to the syntax processor. This will be the last packet of the insertion stream. The syntax processor processes this last packet of the insertion stream so that there is no data from the next frame or sequence of frames included in the packet. Thus, the resulting data stream will be MPEG compliant. At block 544, the syntax processor adds a sequence end code field to the last packet of the insertion stream.

At block 546, the syntax processor processes the first packet of the main stream (which contains the sequence start code) so that any data before the sequence start code in this packet that is coming from main stream is replaced with zeros. The packet's transport header and PES header are also modified to ensure that the output stream is MPEG compliant. The syntax processor also sets the discontinuity indicators of the main stream in the MSB for all the packets before the PCR packet to "1".

At block 548, the video buffer manager calculates the number of null packets to pad. At block 550, at the end of IS, which is designated sp_out', an interrupt signal, Insertion Stream Done (ISD), is generated. At block 552, after receiving the ISD signal, the system reads the null packets from the data buffer and writes to the output stream. At block 554, at the end of the null packets, an interrupt signal, Null Packets Done (NPD), is generated. At block 556, after receiving the NPD signal, the system begins to read from the MSB at a point which is designated sp_out. Thus, at this time, the insertion stream ends and the next portion of the main stream begins to be output. At the same time, the ISP reads from the insertion stream and puts a new sequence in the ISB for future use. The process continues at block 506, where the MSP parses the main stream for the next splicing signal, T_in.

In practice, the invention is particularly suitable for inserting commercial messages into one or more network television programs. For example, often times a network program is transmitted via satellite to local cable system operators. The cable system operator has the task of inserting commercials from local businesses into the main stream. In this case, it may be desirable to provide commercials, for example, every twenty minutes. Furthermore, assume one commercial is inserted, and that the commercial has a duration of one minute. Then, for a network program which runs from 8:00 p.m. to 9:00 p.m., we may have T_in=8:00 p.m., T_out=8:01 p.m., then T_in=8:20 p.m., T_out=8:21 p.m., and finally T_in=8:59 p.m., T_out=9:00 p.m. Other variations are possible, of course. For example, a prerecorded series of commercials may be assembled. In this case, the beginning of the first commercial will correspond to T_in, and the end of the last commercial may correspond to T_out. Alternatively, the network program may include one or more commercials already in the main transport stream. In this case, the present invention may be used to replace selected ones of the main stream commercials, or to remove selected ones of the commercials without replacement. Note that the latter case may not be possible in real-time.

In order to implement the processing flow of FIG. 5, the structure of a packetized data stream must be examined in greater detail. In a packetized digital data stream, typically the packets carrying the compressed video data will be multiplexed with other packets, e.g., carrying corresponding audio data and control information necessary to reconstruct a television signal. One standard for transporting digital television signals in this manner is the MPEG-2 standard, details of which can found in document AVC-491, version 1, April, 1993, published by the Telecommunications Standardization Sector, Study Group 15, Experts Group 4ATM-Video Coding of the International Organization for Standardization, ISO-IEC/JTC1/SC29/WG11 entitled "Coded Representation of Picture and Audio Information," incorporated herein by reference; ISO/IEC 13818-2, Mar. 25, 1994, entitled "Generic Coding of Moving Pictures and Associated Audio," incorporated herein by reference; and ISO/IEC 13818-1, Apr. 27, 1995, entitled "Coding of Audio, Picture, Multimedia and Hypermedia Information," incorporated herein by reference. Further details of the video syntax and semantics for MPEG-2 video can be found in International Organization for Standardization document ISO/IEC 11172-6 dated Apr. 2, 1993 and entitled "Revised Syntax and Semantics for MPEG-2 Video," also incorporated herein by reference. Also of interest, and incorporated herein by reference, is document MC68VDP/D, a preliminary data sheet entitled "MPEG-2/DCII Video Decompression Processor," ©Motorola Microprocessor and Memory Technologies Group, 1994 which describes a video decompression processor using the MPEG-2 and DigiCipher®II standards.

In the MPEG-2 system (and the similar DigiCipher® II system proprietary to General Instrument Corporation, the assignee hereof) a transport stream, or transport multiplex is made up of a contiguous set of fixed length packets. Each packet is 188 total bytes in length, with the first four of those bytes being defined as the packet header. The payload portion of each packet is thus normally 184 bytes. However, a variable length adaptation field may be provided to extend the header, when required. When an adaptation field is present, the payload portion of the packet will be correspondingly shorter.

Various timing and identification information is provided in different portions of the transport stream. These include a packet identifier (PID) found in the transport header of each transport packet to provide a reference number for identifying the transport packets carrying a specific service component. This number is included in a service definition or "service map" used by the receiver to identify those transport packets required to reconstruct a television program signal. The PID may also be referenced for various grooming and remultiplexing functions. In the case of video, audio or isochronous control data, the stream of packets labeled with a single PID represents a single video, audio or isochronous data service elementary stream, respectively. Each type of packet will have a different PID identifying the packet type.

Timing information carried by the transport stream includes a program clock reference (PCR) which effectively represents a sample of the system time clock (STC) time base that underlies the service composed of the PIDs referenced in the service map. The PID carrying the packet with the PCR is also referenced in the service map. The video, audio and isochronous data components of a service are locked through a defined relationship to the system time clock. The PCR serves to define the transport rate, in the sense that between any two successive PCRs in one PID, the transport rate is constant and nominally equal to the system time clock rate times the ratio of the total number of transport bytes between the PCRs divided by the difference in the PCRs in units of system time clock ticks.

The timing information carried by the transport stream also includes time stamps for the commencement of decoding and presentation of data for display. The presentation time stamp (PTS) is used for service component acquisition and also for evaluating whether timing and buffer control are operating properly at the decoder. The decoder time stamp (DTS) is used to indicate when the decoder should start to decode the first access unit (e.g., video frame) that starts in the payload of a packetized elementary stream (PES) packet whose header includes the DTS. A packetized elementary stream is a data stream composed of end-to-end PES packets which have variable length and are typically far longer than a fixed length transport packet. Thus, a PES packet is typically composed of data from a plurality of transport packets.

FIGS. 6a to 6c are diagrammatic illustrations showing how variable length PES packets are reorganized into fixed length transport packets for use in providing a transport multiplex for transmission. FIG. 6a illustrates a portion of a packetized elementary stream carrying successive PES packets, each having a header (PES-HDR) 672 and a PES payload 674. The PES packets 670 are of variable length. PES packets are typically several thousand bytes in length. They are required to be aligned in such a manner that, when divided into transport packet payloads, the first byte of every PES header is located in the first payload position of some transport packet. For any transport packet carrying the aligned PES header, a "payload unit start indicator" will be set in the transport header for the transport packet. In the MPEG-2 and DigiCiphero® II systems, the PES format is used for all service components that are inherently synchronous. More particularly, video, audio and isochronous data components are carried as packetized elementary streams, and the PES headers 672 will carry various information necessary to define the payload, including a packet start code prefix, a stream identification, and a PES packet length.

The header may also contain a presentation time stamp (PTS) or decode time stamp (DTS). The PTS is a field which indicates the value that corresponding bytes of the decoder system time clock reference should have when the first presentation unit (i.e., video frame, audio sync frame, isochronous data access unit) whose access unit starts somewhere in the payload of this PES packet is presented. For video, an access unit starts if the first byte of the picture start code is present in the payload of the PES packet. For audio, an access unit starts if the first byte of the sync word is present in the payload of this PES packet. For isochronous data, an access unit starts if the first byte of the data header is present in the payload of this PES packet. The PTS field is used for service component acquisition, and also for evaluating whether timing and buffer control are operating properly at the decoder.

The DTS is a field indicating what value corresponding bits of the decoder system time clock reference should have when the decoder starts to decode the first access unit that starts somewhere in the payload of this PES packet. The PTS and DTS differ only for video, and only in the case of the I-frame and the P-frames transmitted with B-frames.

The PES payload contains the information data that is desired to be transmitted to a receiver. Thus, the payload includes all of the video, audio and control information necessary for the receiver to decode and reconstruct, e.g., a digital television signal.

In order to meet the requirements of robustness and simplicity, a fixed packet length approach is preferred to the variable length PES packets. Thus, as illustrated in FIG. 6b, the packet elementary stream containing the PES packets 670 is reconfigured into a stream of fixed length transport packets 680. The transport packets illustrated in FIG. 6b all correspond to the same service component, such as the video component of a digital television transmission. In the MPEG-2 and DigiCipher® II embodiments, each packet is 188 total bytes in length, with the first four bytes comprising a transport packet header (TP HDR) 682. The payload portion 684 of each packet 680 is thus normally 184 bytes. However, an adaptation field mechanism is present, as illustrated by transport packet 680', to extend the header when required. The adaptation field 686 provides additional information which is not required for every transport packet. The adaptation field (ADPT FIELD) 686 extends the regular transport header 682 at the expense of payload 684, which will be less than 184 bytes whenever the adaptation is provided. The adaptation field 686 is of variable length, depending on the information it contains. Typically, the adaptation field will support additional information for time base recovery and other functions, and also provides a mechanism for padding the payload when it does not occupy the full 184 bytes. Such padding can be used, for example, to make a variable rate video packetized elementary stream into a constant rate transport stream.

As indicated in FIG. 6b, the transport header of each transport packet includes the PID which identifies the particular service component carried by the transport packet. The PCR will be carried by an adaptation field to provide timing information for a desired service. At a receiver, the PCR for the desired service is detected from the adaptation field. The PIDs of the transport packets will then be monitored in accordance with the timing established by the PCR to recover those transport packets carrying a particular component of the service to be processed.

Transport packets from various service components are multiplexed into a transport multiplex 690 as illustrated in FIG. 6c. The transport multiplex will carry interspersed packets from each of the different components (e.g., video, audio and control) necessary to reconstruct a service at the receiver. In the illustrative transport multiplex shown in FIG. 6c, video transport packets 680 ($A_1, A_2, A_3 \ldots$) are followed by audio components 692 ($B_1, B_2, B_3 \ldots$) which, in turn, are followed by control component packets 694 ($C_1, C_2, C_3 \ldots$).

With the foregoing in mind, the operation of the syntax processor 470 of the IPU 400 in fixing the packets of the main stream or the insertion can now be discussed. First, the process of blocks 508 and 540 will be discussed, wherein the last packet of the main or insertion stream, respectively, before the splicing point, is processed to maintain compliance with an MPEG or similar communication protocol. The splicing point is the boundary between the main and insertion stream packets. This corresponds to the point between sp_in of the main stream and sp_in' of the insertion stream when the output stream transitions from the main to the insertion stream, or to the point between sp_out' of the insertion stream and sp_out of the main stream when the output stream transitions from the insertion to the main stream.

Generally, the last packet of the data stream before the splicing point has to be processed since the transport packet boundary may not be the same as the picture boundary. This last packet will be referred to as a pre-splicing data packet. In this case, the pre-splicing packet will contain part of the data from the next (anchor) frame. The pre-splicing packet can be fixed by discarding the data from the next frame and stuffing the same amount of bytes to the adaptation field of the last packet, where it is understood that stuffing bytes are simply dummy bytes of data. If an adaptation field does not exist in the last packet, it can be created. Note that after fixing the information contained in the adaptation_field and pes_hdr, including adaptation_field_length, payload_unit_start_indicator, pes_length, and other parameters, may be changed. However, this is not expected to result in any visible discontinuity or artifacts to the viewer when the data is displayed.

Processing of the pre-splicing packet is treated differently depending on whether the packet has an adaptation field and a PES header, and further depending on the location of data fields in the packet. FIGS. 7a–7d show a pre-splicing data packet having an adaptation field and PES header before and after processing in accordance with the present invention.

In FIG. 7a, the packet, shown generally before processing at 700, includes a transport header 701, an adaptation field 702 carrying K bytes, a first data field 703, a PES header (pes_hdr) 704, a second data field 705, a picture start code 706 carrying four bytes, and a third data field 707 carrying M bytes. In this case, it can be seen that there is data carried in the packet 700 between the adaptation_field 702 and the pes_hdr 704, and between the pes_hdr 704 and the pic_start_code 706.

Moreover, since the pic_start_code 706 defines the start of a new picture or frame, it can be seen that the third data field 707 carries data of the new frame. Thus, in accordance with the present invention, the packet 700 is processed by discarding the data of the pic_start_code 706 and the associated third data field 707, and stuffing 4+M dummy bytes in the adaptation field 702. This results in the processed packet 710 which includes the adaptation field 712, and which terminates with the second data field 705. The packet 710 includes data from only one picture and does not require the next adjacent packet to maintain continuity.

Note that in FIGS. 7–11, the relative width of a packet or a field thereof does not necessarily indicate the amount of data carried in the field or the packet.

In FIG. 7b, the unprocessed packet is shown generally at 720, and the processed packet is shown generally at 730. Here, there is data between the adaptation_field 702 and the pes_hdr 704, but not between the pes_hdr 704 and the pic_start_code 706. In accordance with the present invention, the packet 720 is processed by discarding the data of the pes_hdr 704, pic_start_code 706 and the third data field 707, and stuffing N+4+M dummy bytes in the adaptation field 702. This results in the processed packet 730 which includes the adaptation field 732, and which terminates with the first data field 703.

In FIG. 7c, the unprocessed packet is shown generally at 740, and the processed packet is shown generally at 750. Here, there is data between the pes_hdr 704 and the pic_start_code 706, but not between the adaptation_field 702 and the pes_hdr 704. In accordance with the present invention, the packet 740 is processed by discarding the data of the pic_start_code 706 and the third data field 707, and stuffing 4+M dummy bytes in the adaptation field 702. This results in the processed packet 750 which includes the adaptation field 752, and which terminates with the second data field 705.

In FIG. 7d, the unprocessed packet is shown generally at 760. Here, there is no data field between the pes_hdr 704 and the pic_start_code 706, or between the adaptation_field 702 and the pes_hdr 704. In accordance with the present invention, as shown at 770, the entire packet 760 is not transmitted since there would be no data fields remaining after discarding the third data field 707.

FIGS. 8a and 8b show a pre-splicing data packet having an adaptation field but no PES header before and after processing in accordance with the present invention. In FIG. 8a, the unprocessed packet is shown generally at 800, and the processed packet is shown generally at 810. Here, there is data between the adaptation field 802 and the pic_start_code 804. In accordance with the present invention, the packet 800 is processed by discarding the data of the pic_start_code 804 and the second data field 805, and stuffing 4+M dummy bytes in the adaptation field 802. This results in the processed packet 810 which includes the adaptation field 812, and which terminates with the first data field 803.

In FIG. 8b, the unprocessed packet is shown generally at 820. Here, there is no data field between the adaptation field 802 and the pic_start_code 804. In accordance with the present invention, as shown at 830, the entire packet 820 is not transmitted since there would be no data fields remaining after discarding the second data field 805.

FIGS. 9a–9d show a pre-splicing data packet having no adaptation field but with a PES header before and after processing in accordance with the present invention. In this case, an adaptation field is created which carries the dummy stuffing bits which account for the discarded fields. In FIG. 9a, the packet, shown generally before processing at 900, includes a transport header 901, a first data field 902, a PES header 903, a second data field 904, a picture start code 905 carrying four bytes and a third data field 906 carrying M bytes. In this case, data is carried between the tp_hdr 901 and the pes_hdr 903, and between the pes_hdr 903 and the pic_start_code 905. In accordance with the present invention the packet 900 is processed by discarding the data of the pic_start_code 905 and the third data field 906, and creating an adaptation field 912 with 4+M dummy bytes as shown in the processed packet 910.

In FIG. 9b, the unprocessed packet is shown generally at 920, and the processed packet is shown generally at 930. Here, there is data between the tp_hdr 901 and the pes_hdr 903, but not between the pes_hdr 903 and the pic_start_code 905. In accordance with the present invention, the packet 920 is processed by discarding the data of the pes_hdr 903, pic_start_code 905, and the third data field 906, and creating an adaptation field 932 with N+4+M dummy bytes, as shown in the processed packet 930.

In FIG. 9c, the unprocessed packet is shown generally at 940, and the processed packet is shown generally at 950. Here, there is data between the pes_hdr 903 and the pic_start_code 905, but not between the tp_hdr 901 and the pes_hdr 903. In accordance with the present invention, the packet 940 is processed by discarding the data of the pic_start_code 905 and the third data field 906, and creating an adaptation field 952 with 4+M dummy bytes, as shown in the processed packet 950.

In FIG. 9d, the unprocessed packet is shown generally at 960. Here, there is no data field between the tp_hdr 901 and the pes_hdr 903, or between the pes_hdr 903 and the pic_start_code 905. In accordance with the present invention, as shown at 970, the entire packet 960 is not transmitted since there would be no data fields remaining after discarding the third data field 906.

FIGS. 10a and 10b show a pre-splicing data packet having no adaptation field or PES header before and after processing in accordance with the present invention. In this case, an adaptation field is created which carries the dummy stuffing bits which account for the discarded fields. In FIG. 10a, the unprocessed packet is shown generally at 1000, and the processed packet is shown generally at 1010. Here, there is data between the tp_hdr 1001 and the pic_start_code 1003. In accordance with the present invention, the packet 1000 is processed by discarding the data of the pic_start_code 1003 and the second data field 1004, and creating an adaptation field 1012 with 4+M dummy bytes, as shown in the processed packet 1010.

In FIG. 10b, the unprocessed packet is shown generally at 1020. Here, there is no data field between the tp_hdr 1001 and the pic_start_code 1003. In accordance with the present invention, as shown at 1030, the entire packet 1020 is not transmitted since there would be no data fields remaining after discarding the second data field 1004.

Now, the process of blocks 516 and 546 will be discussed, wherein the first packet of the main stream after the second splicing point (e.g., sp_out), is processed to maintain compliance with the MPEG or similar communication protocol. This first packet will be referred to as a post-splicing data packet. As with the pre-splicing packet, processing of the post-splicing packet is treated differently depending on whether the packet has an adaptation field and a PES header, and further depending on the location of data fields in the packet. In particular, the first post-splicing packet must be processed by the syntax processor 470 when the splicing point does not correspond exactly to a picture boundary. In this case, the post-splicing packet may contain part of the data from a previous picture or sequence of pictures.

In accordance with the present invention, the post-splicing packet is fixed by discarding the data from the previous sequence and stuffing a compensating number of dummy bytes to the adaptation field of the post-splicing packet. Furthermore, an adaptation field is created if it does not already exist. Moreover, as with the processing of the pre-splicing packet, the information contained in the adaptation_field and pes_hdr, including adaptation_field_length, payload_unit_start_indicator, pes_length, and other parameters, may be changed, but this is no expected to result in any visible discontinuity or artifacts to the viewer when the data is displayed.

Figure 11A:
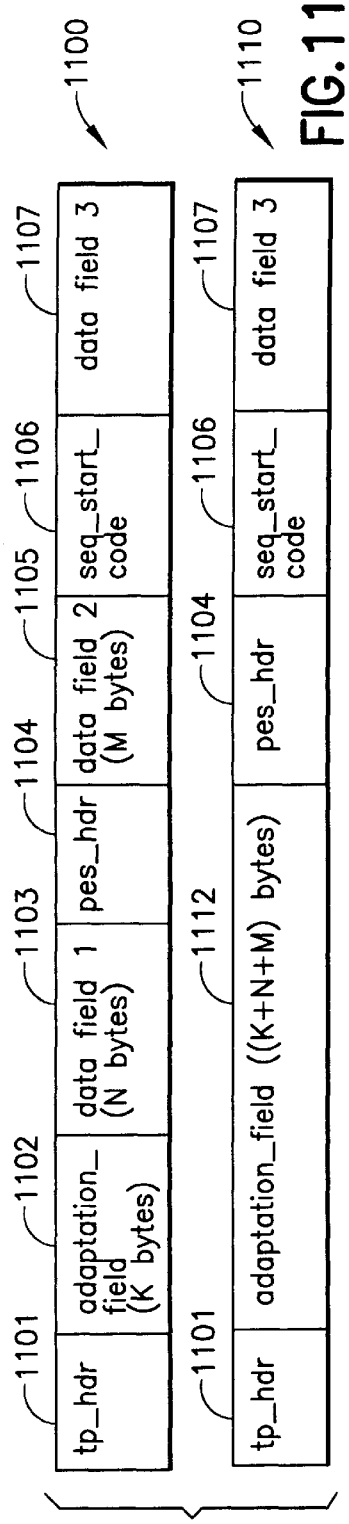
FIGS. 11a–11d show a post-splicing data packet having an adaptation field and PES header before and after processing in accordance with the present invention.

FIGS. 11a–11d show a post-splicing data packet having an adaptation field and PES header before and after processing in accordance with the present invention. In FIG. 11a, the packet, shown generally before processing at 1100, includes a transport header 1101, an adaptation field 1102 carrying K bytes, a first data field 1103 carrying N bytes, a PES header, pes_hdr 1104, a second data field 1105 carrying M bytes, a sequence start code 1106 and a third data field 1107. In this case, it can be seen that there is data carried between the adaptation_field 1102 and the pes_hdr 1104, and between the pes_hdr 1104 and the seq_start_code 1106.

Moreover, the seq_start_code 1106 defines the start of a new sequence of pictures, and the first data field 1103 and the second data field 1105 carry data of a picture from a previous sequence. Thus, in accordance with the present invention the packet 1100 is processed by discarding the first data field 110 and the second data field 1105, and stuffing N+M dummy bytes in the adaptation field 1102. This results in the processed packet 1110 which includes the adaptation field 1112. The packet 1110 includes data from only one sequence of pictures and does not require the previous adjacent packet to maintain continuity.

Figure 11B:
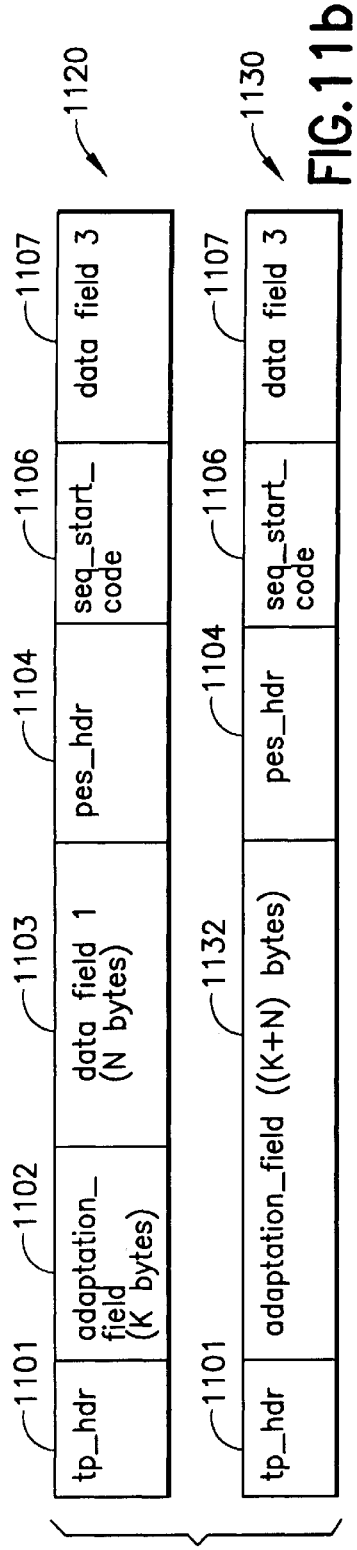

In FIG. 11b, the unprocessed packet is shown generally at 1120, and the processed packet is shown generally at 1130. Here, there is data between the adaptation_field 1102 and the pes_hdr 1104, but not between the pes_hdr 1104 and the seq_start_code 1106. In accordance with the present invention, the packet 1120 is processed by discarding the first data field 1103, and stuffing N dummy bytes into the adaptation field 1102. This results in the processed packet 1130 which includes the adaptation field 1132.

Figure 11C:
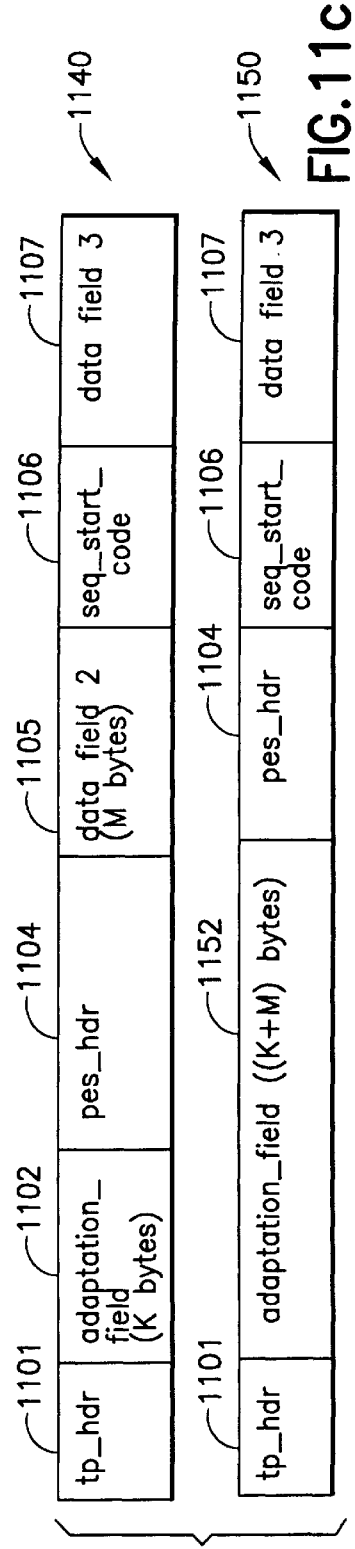

In FIG. 11c, the unprocessed packet is shown generally at 1140, and the processed packet is shown generally at 1150. Here, there is data between the pes_hdr 1104 and the seq_start_code 1106, but not between the adaptation_field 1102 and the pes_hdr 1104. In accordance with the present invention, the packet 1140 is processed by discarding the second data field 1105, and stuffing M dummy bytes in the adaptation field 1102. This results in the processed packet 1150 which includes the adaptation field 1152.

Figure 11D:
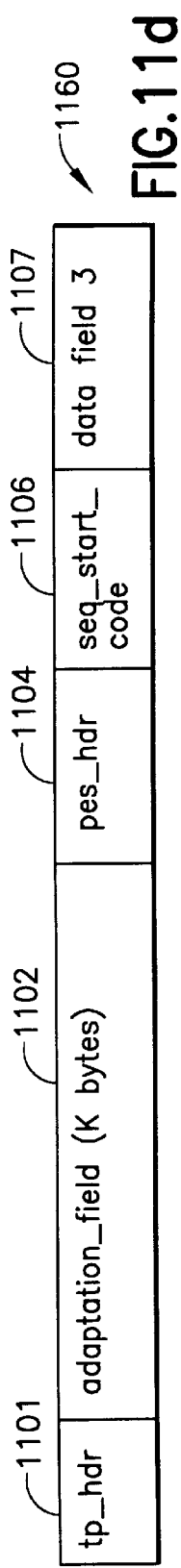

In FIG. 11d, the unprocessed packet is shown generally at 1160. Here, there is no data field between the pes_hdr 1104 and the seq_start_code 1106, or between the adaptation_field 1102 and the pes_hdr 1104. In accordance with the present invention, the entire packet 1160 is transmitted without modification since there is no data field prior to the seq_start_code 1106.

Figure 12A:
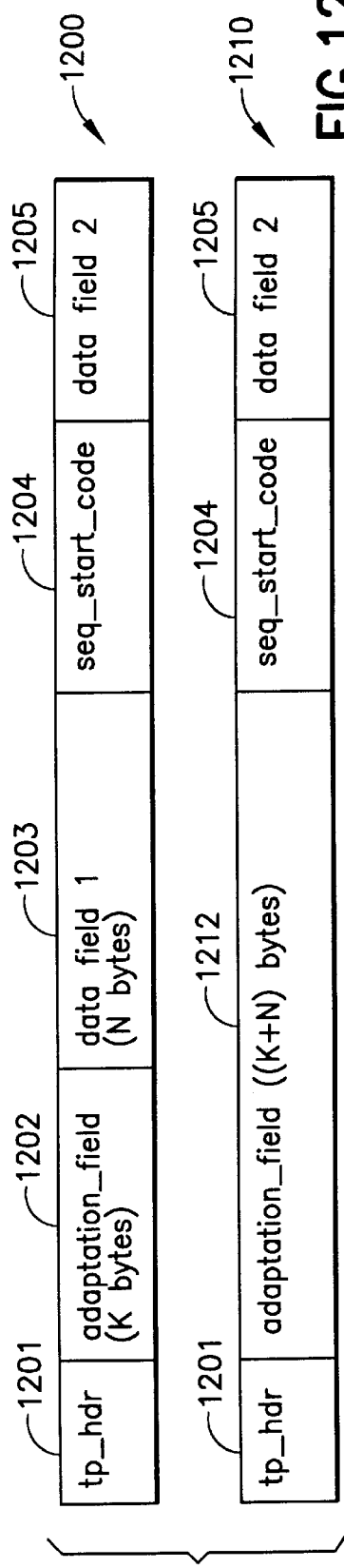
FIGS. 12a and 12b show a post-splicing data packet having an adaptation field but no PES header before and after processing in accordance with the present invention.
Figure 12B:
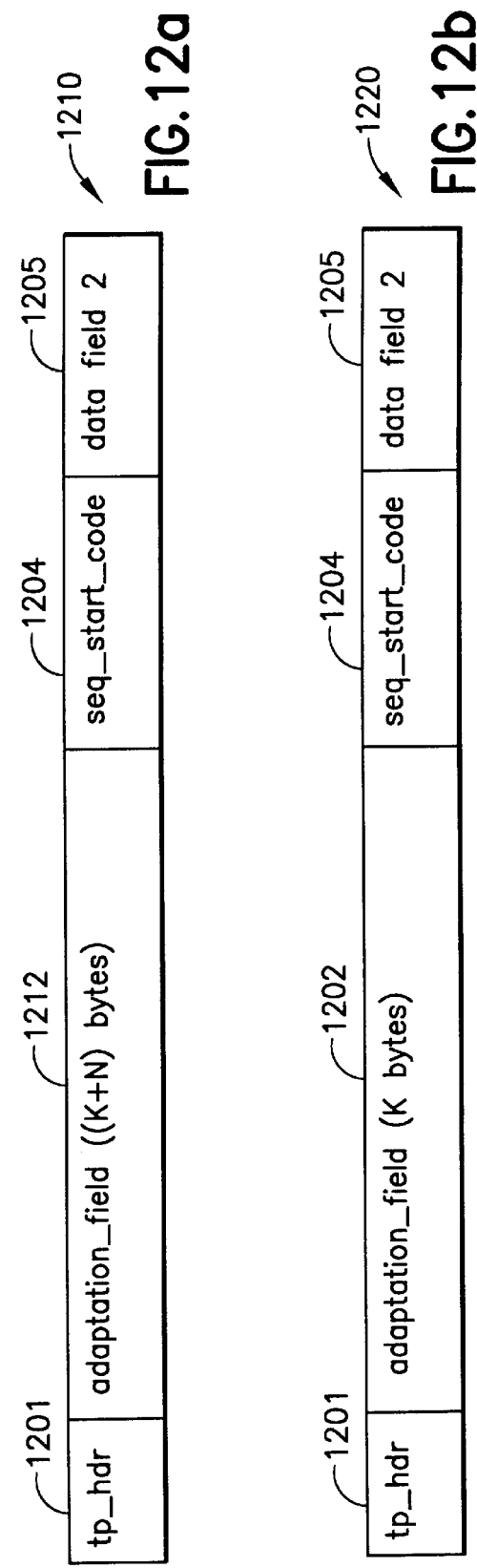

FIGS. 12a and 12b show a post-splicing data packet having an adaptation field but no PES header before and after processing in accordance with the present invention. In FIG. 12a, the unprocessed packet is shown generally at 1200, and the processed packet is shown generally at 1210. Here, there is data between the adaptation field 1202 and the seq_start_code 1204. In accordance with the present invention, the packet 1200 is processed by discarding the first data field 1203 and stuffing N dummy bytes in the adaptation field 1202. This results in the processed packet 1210 which includes the adaptation field 1212.

In FIG. 12b, the unprocessed packet is shown generally at 1220. Here, there is no data field between the adaptation field 1202 and the seq_start_code 1204. In accordance with the present invention, the entire packet 1220 is transmitted without modification since there is no data field prior to the seq_start_code 1204.

Figure 13D:
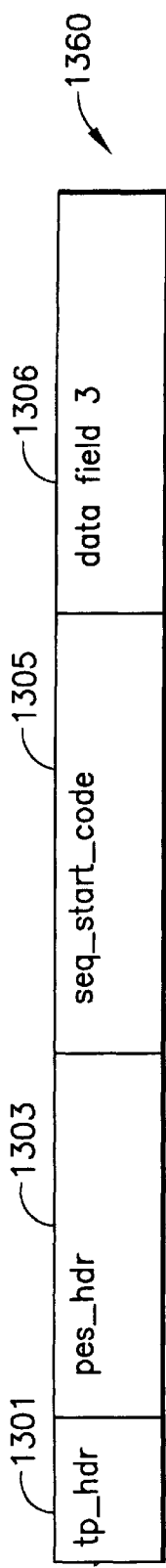

FIGS. 13a–13d show a post-splicing data packet having no adaptation field but with a PES header before and after processing in accordance with the present invention. In FIG. 13a, the packet, shown generally before processing at 1300, includes a transport header 1301, a first data field 1302 carrying N bytes, a PES header 1303, a second data field 1304 carrying M bytes, a sequence start code 1305 and a third data field 1306. In this case, it can be seen that there is data carried in the packet 1300 between the tp_hdr 1301 and the pes_hdr 1303, and between the pes_hdr 1303 and the seq_start_code 1305. In accordance with the present invention the packet 1300 is processed by discarding the first data field 1302 and the second data field 1304, and creating an adaptation field 1312 with N+M dummy bytes as shown in the processed packet 1310.

In FIG. 13b, the unprocessed packet is shown generally at 1320, and the processed packet is shown generally at 1330.

Here, there is data between the tp_hdr 1301 and the pes_hdr 1303, but not between the pes_hdr 1303 and the seq_start_code 1305. In accordance with the present invention, the packet 1320 is processed by discarding the first data field 1302, and creating an adaptation field 1322 with N dummy bytes, as shown in the processed packet 1330.

In FIG. 13c, the unprocessed packet is shown generally at 1340, and the processed packet is shown generally at 1350. Here, there is data between the pes_hdr 1303 and the seq_start_code 1305, but not between the tp_hdr 1301 and the pes_hdr 1303. In accordance with the present invention, the packet 1340 is processed by discarding the second data field 1304, and creating an adaptation field 1352 with M dummy bytes, as shown in the processed packet 1350.

In FIG. 13d, the unprocessed packet is shown generally at 1360. Here, there is no data field between the tp_hdr 1301 and the pes_hdr 1303, or between the pes_hdr 1303 and the seq_start_code 1305. In accordance with the present invention, the entire packet 1360 is transmitted without modification since there is no data field prior to the seq_start_code 1305.

Figure 14A:
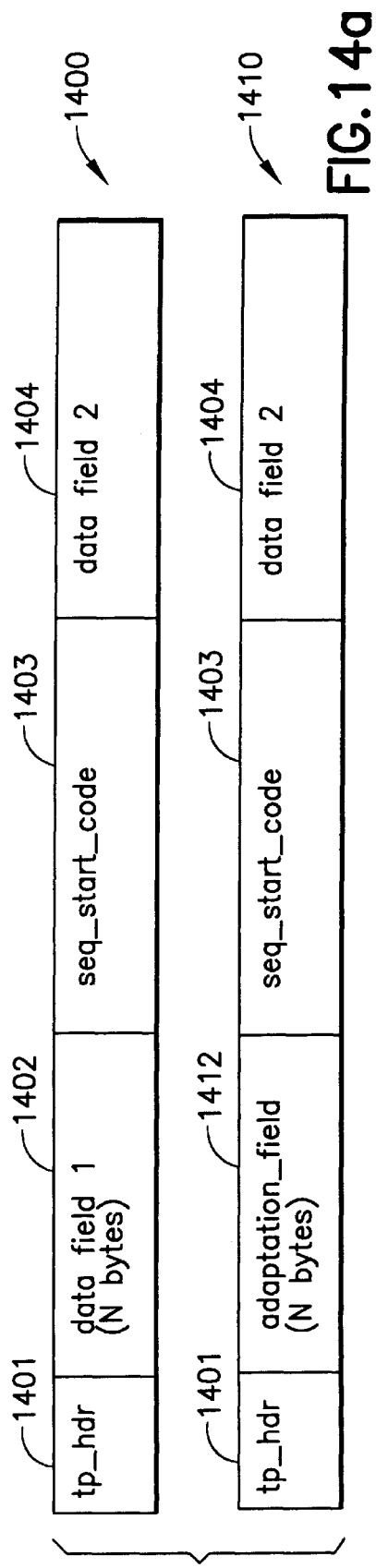
FIGS. 14a and 14b show a post-splicing data packet having no adaptation field or PES header before and after processing in accordance with the present invention.
Figure 14B:
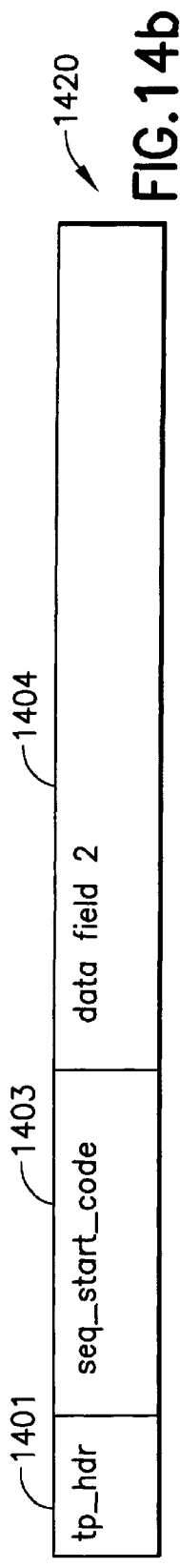

FIGS. 14a and 14b show a post-splicing data packet having no adaptation field or PES header before and after processing in accordance with the present invention. In this case, an adaptation field is created which carries the dummy stuffing bits which account for the discarded fields. In FIG. 14a, the unprocessed packet is shown generally at 1400, and the processed packet is shown generally at 1410. Here, there is data between the tp_hdr 1401 and the seq_start_code 1403. In accordance with the present invention, the packet 1400 is processed by discarding the first data field 1402, and creating an adaptation field 1412 with N dummy bytes, as shown in the processed packet 1410.

In FIG. 14b, the unprocessed packet is shown generally at 1420. Here, there is no data field between the tp_hdr 1401 and the seq_start_code 1403. In accordance with the present invention, the entire packet 1420 is transmitted without modification since there is no data field prior to the seq_start_code 1403.

A decoder for decoding the output data stream may be provided as discussed earlier in connection with FIG. 1. For example, the Digital Entertainment Terminal (DET) 168 can include a decoder with an associated data buffer and processor. The buffer receives the incoming data stream and provides the data to the processor for decoding and other processing which is required to provide a signal suitable for reproduction on a television. As discussed, the provision of null packets in the output data stream will prevent a potential buffer overflow at the decoder.

Accordingly, it can be seen that the present invention provides a method and apparatus for splicing compressed packetized digital video streams. In particular, a secondary packetized data stream, such as a commercial, is spliced with a primary packetized data stream, such as a network television program. The system does not require the decompression of the data in the primary data stream, and is particularly suitable for use at a cable system headend to allow the insertion of commercials from local businesses into a nationally broadcast television program.

Although the invention has been described in connection with various specific embodiments, those skilled in the art will appreciate that numerous adaptations and modifications may be made thereto without departing from the spirit and scope of the invention as set forth in the claims. For example, it is possible to locate the IPU in the decoder at the subscriber's home, thereby providing the subscriber with the capabilities of a in-home digital data mixer such as those used at television, radio and recording studios. This would allow the subscriber to edit various audio, video and data sources. For example, data stored on a DVD or CD-ROM could be spliced with a main program for various educational and entertainment purposes.

We claim:

1. A method for splicing a secondary packetized data stream with a primary packetized data stream, comprising the steps of:

providing a start signal indicating a time to initiate said splicing;

determining a pre-splicing packet of said primary stream according to said start signal;

providing an output stream where a first packet of said secondary stream is positioned to follow said pre-splicing packet;

determining a post-slicing packet of said primary stream which follows said pre-splicing packet;

discarding data of said pre-splicing packet which is associated with said post-splicing packet; and adding an amount of stuffing data to said pre-splicing packet according to the amount of data discarded.

2. A method in accordance with claim 1, wherein the packets of said primary stream and said secondary stream have identifying data associated therewith, comprising the further steps of:

retrieving said identifying data of said primary stream; and replacing said identifying data of said secondary stream with said identifying data of said primary stream.

3. A method in accordance with claim 1, comprising the further steps of:

providing a number L of null packets in said output stream to prevent a buffer overflow at a decoder which receives said output stream; and inserting said null packets between said pre-splicing packet and said first packet;

wherein said number L is determined according to respective data rates of said primary and secondary streams and according to a decoding delay time of said decoder.

4. A method in accordance with claim 2, wherein:

the replaced identifying information of said secondary stream comprises at least one of program specific information (PSI) and packet identifier (PID) information.

5. A method in accordance with claim 1, wherein said pre-splicing packet is a packet of said primary stream with an anchor frame start code which is closest to said start time.

6. A method in accordance with claim 1, wherein said primary stream carries compressed digital data, and said splicing does not require decompression of said compressed digital data.

7. A method in accordance with claim 1, wherein:

the discarded data of said pre-splicing packet includes at least an anchor frame start code and a data field associated therewith.

8. An apparatus for splicing a secondary packetized data stream with a primary packetized data, comprising:

means for providing a start signal indicating a time to initiate said splicing;

means for determining a pre-splicing packet of said primary stream according to said start signal;

means for providing an output stream where a first packet of said secondary stream is positioned to follow said pre-splicing packet;

means for determining a post-splicing packet of said primary stream which follows said pre-splicing packet;

means for discarding data of said pre-splicing packet which is associated with said post-splicing packet; and means for adding an amount of stuffing data to said pre-splicing packet according to the amount of data discarded.

9. An apparatus in accordance with claim 8, wherein the packets of said primary stream and said secondary stream have identifying data associated therewith, further comprising:

means for retrieving said identifying data of said primary stream; and means for replacing said identifying data of said secondary stream with said identifying data of said primary stream.

10. An apparatus in accordance with claim 9, wherein:

the replaced identifying information of said secondary stream comprises at least one of program specific information (PSI) and packet identifier (PID) information.

11. An apparatus in accordance with claim 8, further comprising:

means for providing a number L of null packets in said output stream to prevent a buffer overflow at a decoder which receives said output stream; and means for inserting said null packets between said pre-splicing packet and said first packet;

wherein said number L is determined according to respective data rates of said primary and secondary streams and according to a decoding delay time of said decoder.

12. An apparatus in accordance with claim 8, wherein said pre-splicing packet is a packet of said primary stream with an anchor frame start code which is closest to said start time.

13. An apparatus in accordance with claim 8, wherein:

the discarded data of said pre-splicing packet includes at least an anchor frame start code and a data field associated therewith.

14. An apparatus in accordance with claim 8, wherein said stuffing data is added to said pre-splicing packet in an adaptation field thereof, further comprising:

means for creating said adaptation field if said adaptation field is not already present in said pre-splicing packet.

15. A decoder for decoding a transport data stream which comprises a secondary packetized data stream which is spliced with a primary packetized data stream, wherein a first packet of said secondary stream is positioned to follow a pre-splicing packet of said primary stream, said decoder comprising:

a buffer for storing said transport data; and a processor coupled to receive data from said buffer for processing said transport data; wherein:

a number L of null packets are provided between said pre-splicing packet and said first packet to prevent overflow of said buffer; and said number L is determined according to respective data rates of said primary and secondary streams and according to a decoding delay time of said decoder.

16. A method for splicing a secondary packetized data stream with a primary packetized data stream, comprising the steps of:

providing a start signal indicating a time to initiate said splicing;

determining a pre-splicing packet of said primary stream according to said start signal;

providing an output stream where a first packet of said secondary stream is positioned to follow said pre-splicing packet;

determining a post-splicing packet of said primary stream which follows said pre-splicing packet;

positioning said post-splicing packet to follow a last packet of said secondary stream in said output stream;

discarding data of said post-splicing packet which is associated with a packet of said primary stream which precedes said post-splicing packet; and adding an amount of stuffing data to said post-splicing packet according to the amount of data discarded.

17. A method in accordance with claim 16, wherein said post-splicing packet is a packet of said primary stream with a sequence start code which directly follows a sequence end code which is associated with said last packet of said secondary stream.

18. A method in accordance with claim 16, wherein the packets of said primary stream and said secondary stream have identifying data associated therewith, comprising the further steps of:

retrieving said identifying data of said primary stream; and replacing said identifying data of said secondary stream with said identifying data of said primary stream.

19. A method in accordance with claim 18, wherein:

the replaced identifying information of said secondary stream comprises at least one of program specific information (PSI) and packet identifier (PID) information.

20. A method in accordance with claim 16, comprising the further steps of:

providing a number L of null packets in said output stream to prevent a buffer overflow at a decoder which receives said output stream; and inserting said null packets between said pre-splicing packet and said first packet;

wherein said number L is determined according to respective data rates of said primary and secondary streams, and according to a decoding delay time of said decoder.

21. A method in accordance with claim 16, wherein:

said pre-splicing packet is a packet of said primary stream with an anchor frame start code which is closest to said start time.

22. An apparatus for splicing a secondary packetized data stream with a primary packetized data stream, comprising:

means for providing a start signal indicating a time to initiate said splicing;

means for determining a pre-splicing packet of said primary stream according to said start signal;

means for providing an output stream where a first packet of said secondary stream is positioned to follow said pre-splicing packet;

means for determining a post-splicing packet of said primary stream which follows said pre-splicing packet;

means for positioning said post-splicing packet to follow a last packet of said secondary stream in said output stream;

means for discarding data of said post-splicing packet that is associated with a packet of said primary stream which precedes said post-splicing packet; and means for adding an amount of stuffing data to said post-splicing packet according to the amount of data discarded.

23. An apparatus in accordance with claim 22, wherein said post-splicing packet is a packet of said primary stream with a sequence start code which directly follows a sequence end code which is associated with said last packet of said secondary stream.

24. An apparatus in accordance with claim 22, wherein the packets of said primary stream and said secondary stream have identifying data associated therewith, further comprising:

means for retrieving said identifying data of said primary stream; and means for replacing said identifying data of said secondary stream with said identifying data of said primary stream.

25. An apparatus in accordance with claim 24, wherein:

the replaced identifying information of said secondary stream comprises at least one of program specific information (PSI) and packet identifier (PID) information.

26. An apparatus in accordance with claim 22, further comprising:

means for providing a number L of null packets in said output stream to prevent a buffer overflow at a decoder which receives said output stream; and means for inserting said null packets between said pre-splicing packet and said first packet;

wherein said number L is determined according to respective data rates of said primary and secondary streams, and according to a decoding delay time of said decoder.

27. An apparatus in accordance with claim 22, wherein:

said pre-splicing packet is a packet of said primary stream with an anchor frame start code which is closest to said start time.

28. An apparatus in accordance with claim 8, wherein said primary stream carries compressed digital data, and said splicing does not require decompression of said compressed digital data.

29. A method in accordance with claim 1, wherein said stuffing data is added to said pre-splicing packet in an adaptation field thereof, comprising the further step of:

creating said adaptation field if said adaptation field is not already present in said pre-splicing packet.

* * * * *

UNITED STATES PATENT AND TRADEMARK OFFICE
CERTIFICATE OF CORRECTION

PATENT NO. : 5,917,830
DATED : June 29, 1999
INVENTOR(S) : Chen et al.

It is certified that error appears in the above-identified patent and that said Letters Patent is hereby corrected as shown below:

Column 22, line 59: In claim 8, --stream-- is inserted after "primary packetized data".

Signed and Sealed this

Thirtieth Day of November, 1999

Attest:

Q. TODD DICKINSON

Attesting Officer

Acting Commissioner of Patents and Trademarks